US006212645B1

United States Patent
Tjandrasuwita

(12) United States Patent
(10) Patent No.: US 6,212,645 B1
(45) Date of Patent: Apr. 3, 2001

(54) PROGRAMMABLE AND FLEXIBLE POWER MANAGEMENT UNIT

(75) Inventor: Ignatius Tjandrasuwita, Union City, CA (US)

(73) Assignee: Mediaq Inc., Santa Clara, CA (US)

( * ) Notice: Subject to any disclaimer, the term of this patent is extended or adjusted under 35 U.S.C. 154(b) by 0 days.

(21) Appl. No.: 09/169,438

(22) Filed: Oct. 9, 1998

(51) Int. Cl.[7] .................................................. G06F 1/32
(52) U.S. Cl. ........................... 713/330; 713/323; 713/324
(58) Field of Search ..................................... 713/300–340

(56) References Cited

U.S. PATENT DOCUMENTS

| | | | |
|---|---|---|---|
| 5,615,376 | 3/1997 | Rangnanthan | 395/750 |
| 5,623,677 | * 4/1997 | Townsley et al. | 713/310 |
| 5,629,694 | * 5/1997 | Simon et al. | 341/22 |
| 5,692,197 | * 11/1997 | Narad et al. | 713/323 |
| 5,710,929 | 1/1998 | Fung | 395/750 |
| 5,752,050 | * 5/1998 | Hernandez et al. | 713/330 |
| 5,844,813 | * 12/1998 | Tateyama | 713/330 |
| 5,878,264 | * 3/1999 | Ebrahim | 713/323 |
| 5,919,264 | * 7/1999 | Reneris | 713/324 |
| 5,925,133 | * 7/1999 | Buxton et al. | 713/323 |
| 5,978,923 | * 11/1999 | Kou | 713/323 |
| 6,088,807 | * 7/2000 | Maher et al. | 713/324 |

FOREIGN PATENT DOCUMENTS

| | | | |
|---|---|---|---|
| 0 666 526 | 1/1995 | (EP) | G06F/1/32 |
| WO 96/41252 | 6/1995 | (WO) | G06F/1/32 |

* cited by examiner

Primary Examiner—Paul R. Myers
(74) Attorney, Agent, or Firm—Nguyen & Associates

(57) ABSTRACT

A programmable Power Management Unit (PMU) is provided. The Power Management Unit (PMU) supports a number of different power states namely a normal power state, a software-controlled sleep power sate, a hardware-controlled sleep power state, and two register programmable power states. In the normal power state, all circuits in the integrated circuit (e.g., graphics/display controller) are enabled. In the software-controlled sleep power state, all circuits in the integrated circuit are disabled except for frame buffer memory refresh logic and part of the bus interface. In the hardware-controlled sleep power state, all circuits in the integrated circuit are disabled except for the memory interface logic. In the two register programmable power states, circuits can be selectively powered up or down as desired in a single power sequencing. Moreover, under the present invention, the interval between circuits that are being disabled or enabled in a power sequencing is also programmable.

38 Claims, 13 Drawing Sheets

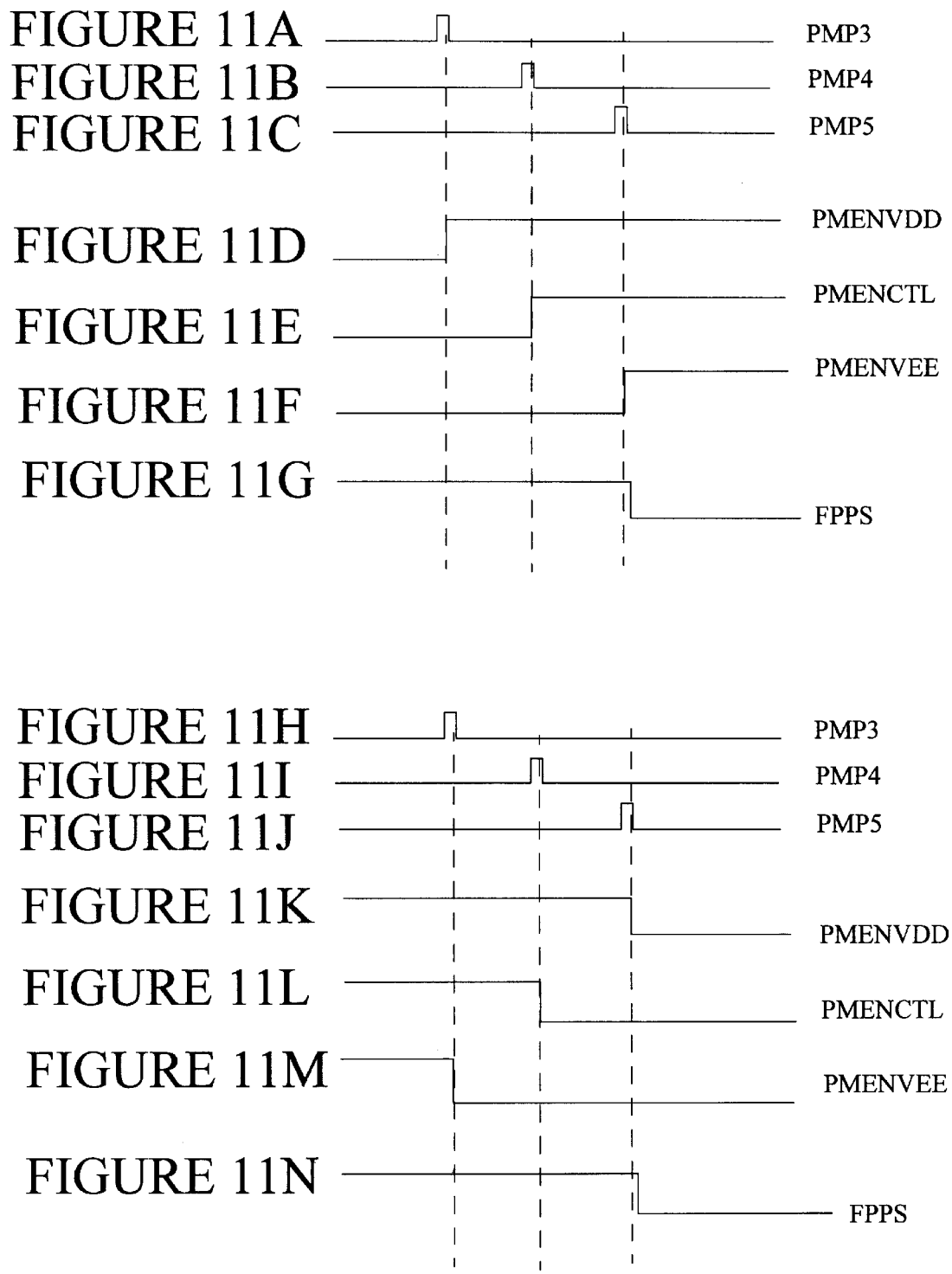

PROGRAMMABLE AND FLEXIBLE POWER MANAGEMENT UNIT

FIELD OF THE INVENTION

The invention generally relates to computer systems, and more particularly relates to managing power sequences to disable and enable circuits.

BACKGROUND OF THE INVENTION

With the advances of semiconductor and computer technology, computer systems are becoming faster and at the same time smaller in size. Desk-top and even lap-top computer systems now possess processing speeds of main-frame computers that used to fill up a small room. Even hand-held computer systems such as personal digital assistants (PDA), which are becoming more popular, are getting more powerful. As computer systems become more miniaturized and inexpensive, more demands are constantly being required of them as well. One such demand is speed or performance.

At the same time, as computer systems become more powerful and more miniaturized, power-conservation also presents a difficult challenge to overcome. Because of their small size, hand-held computer systems are powered by battery which have limited operating duration. Since more power is required for faster and more powerful processors, innovative solutions are required to conserve power and thereby extend the battery operating duration.

Within each computer system are many integrated circuits designed to perform different functions such as a memory controller, a hard disk controller, a graphics/video controller, a communications controller, and other peripheral controllers. As is well-known, each of these integrated circuits is supplied a clock signal to be used as a timing reference in synchronizing the operation of the integrated circuit. In general, power consumption increases as a result of the integrated circuit being clocked faster.

Periodically, an integrated circuit is not needed and is idle insofar as system functionality is concerned. At other times, while a sub-circuit (e.g., combination logic and data path) that performs data processing and transferring in the integrated circuit is still running, other sub-circuits in the integrated circuit are idle. Because these sub-circuits continue to receive a clock signal, their respective internal sub-circuits continue to be exercised and consume significant power, even while they remain idle. Accordingly, to conserve power, the clock signal to idle sub-circuits is disabled. The clock signal to these sub-circuits are then enabled as necessary. Powering up (enabling) and powering down (disabling) selected sub-circuits in an integrated sub-circuit may occur in a required sequence. Such power sequencing is required because some sub-circuits are dependent on other sub-circuits. For example, a sub-circuit needs to be powered up before another sub-circuit can be powered up. Power sequencing is also required when a sub-circuit needs a sequence of input signals to turn on or off as in the case of some synchronous dynamic Random Access Memory (RAM) or a Liquid Crystal Display (LCD) flat panel monitor. Such power sequence is important because if the sequence is not done properly then some circuitry blocks will not be enabled properly.

Power Management Units (PMUS) are typically used to provide the desired power sequencing. Conventional PMUs, however, can only power up or power down selected sub-circuits in one sequence. In other words, conventional PMUs do not have the capability to power up selected sub-circuits and power down other selected sub-circuits in the same sequence. This inflexibility greatly restricts the power sequencing applications of conventional PMUs. Moreover, the power sequences in conventional PMUs are normally predefined which further restrict the applications of conventional PMUs.

Thus, a need exists for a PMU that allows for power up sequencing as well as power down sequencing to occur in one sequence and for selectively powering up and powering down circuits in a power sequence.

SUMMARY OF THE INVENTION

The present invention meets the above need with a programmable and flexible Power Management Unit (PMU). The PMU comprises: a counter circuit, a state machine, a decoder, and a plurality of enable circuits. The counter circuit receives as inputs interval control signals. The counter circuit monitors power sequencing intervals in response to the interval control signals. The counter circuit generates signals indicating whether the power sequencing intervals have expired. The state machine receives as inputs the power sequencing interval status signals and state control signals. In response to the state control signals, the state machine selects a main power state for the PMU, wherein each main power state has N sub-states organized in a sequence. In response to the power sequencing interval status signals, the state machine selects a sub state for the PMU. The state machine generates signals indicating the main power state and sub-state that the state machine is currently engaged.

The decoder circuit receives as inputs the signals from the state machine. In response to the signals from the state machine, the decoder circuit monitors status of the main power state and sub-state that the state machine is currently engaged in and generates status signals to indicate the status of the main power state and sub-state. The plurality of enable circuits receives as inputs the signals from the state machine, the status signals from the decoder circuit, and select signals. The plurality of enable circuits generates signals to enable selected circuits.

All the features and advantages of the present invention will become apparent from the following detailed description of its preferred embodiment whose description should be taken in conjunction with the accompanying drawings.

BRIEF DESCRIPTION OF THE DRAWINGS

FIGS. 11A–11G are exemplary timing diagrams of the power-up sequence associated with flat panel enable circuit 307.

FIGS. 11H–11N are exemplary timing diagrams of the power-down sequence associated with flat panel enable circuit 307.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application in the area involving a graphics/display controller, it is to be appreciated that the present invention is also applicable to any application involving multiple data paths such as communications, core logic, central processing units (CPU), and others.

In accordance to a preferred embodiment of the present invention, the Power Management Unit (PMU) supports five different power states: a normal power state, a software-controlled sleep power state, a hardware-controlled sleep power state, and two register programmable power states. In the normal power state, all circuits in the integrated circuit (e.g., graphics/display controller) can be enabled. In the software-controlled sleep power state, all circuits in the integrated circuit are disabled except for frame buffer memory refresh logic (which can be optionally enabled) and part of the bus interface. In the hardware-controlled sleep power state, all circuits in the integrated circuit are disabled except for the frame buffer memory refresh logic which can be optionally enabled. In the two register programmable power states, circuits can be selectively enabled or disabled as desired. Under the present invention, additional pre-defined power states as well as programmable power states can be added beyond the five power states discussed above.

Accordingly, under the present invention, the programmable power states allow the user to completely decide which module is to be disabled and which is not to be disabled (i.e., is enabled and can be enabled). Furthermore, in accordance to the present invention, the interval between circuits that are being disabled or enabled in a power sequence is also programmable.

Figure 1:
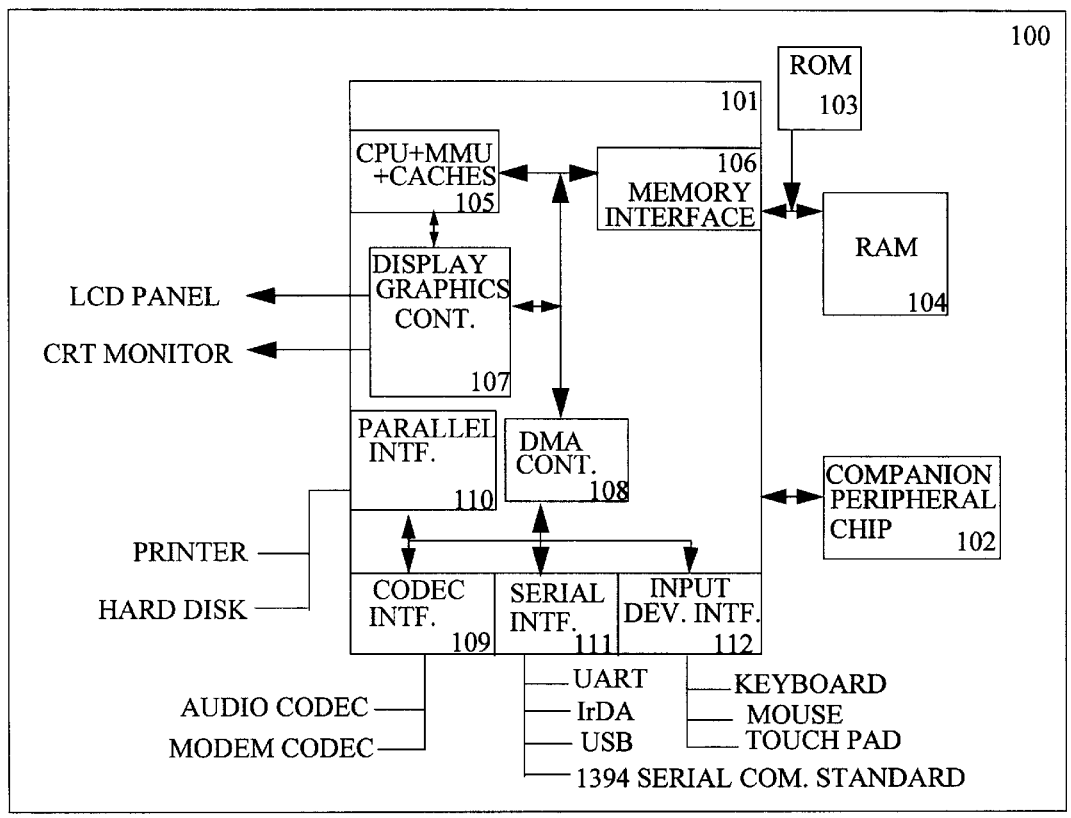
FIG. 1 is a high-level block diagram illustrating a typical computer system that implements the present invention.

Reference is now made to FIG. 1 illustrates, for example, a high-level diagram of computer system 100 upon which the present invention may be implemented or practiced. More particularly, computer system 100 may be a laptop or hand-held computer system. It is to be appreciated that computer system 100 is exemplary only and that the present invention can operate within a number of different computer systems including desk-top computer systems, general purpose computer systems, embedded computer systems, and others.

As shown in FIG. 1, computer system 100 is a highly integrated system which includes of integrated processor circuit 101, peripheral controller 102, read-only-memory (ROM) 103, and random access memory (RAM) 104. The highly integrated architecture allows power to be conserved. Computer system architecture 100 may also include a peripheral controller if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 111, and input device interface 112. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as hard disks, printers, etc. to connect to integrated processor circuit 101. Serial interface 111 provides the interface for serial I/O devices such as universal asynchronous receiver transmitter (UART) to connect to integrated processor circuit 101. Input device interface 112 provides the interface for input devices such as keyboard, mouse, and touch pad to connect to integrated processor circuit 101.

DMA controller 108 accesses data stored in RAM 104 via memory interface 106 and provides the data to peripheral devices connected to CODEC interface 109, parallel interface 110, serial interface 111, or input device interface 112. Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

Figure 2:
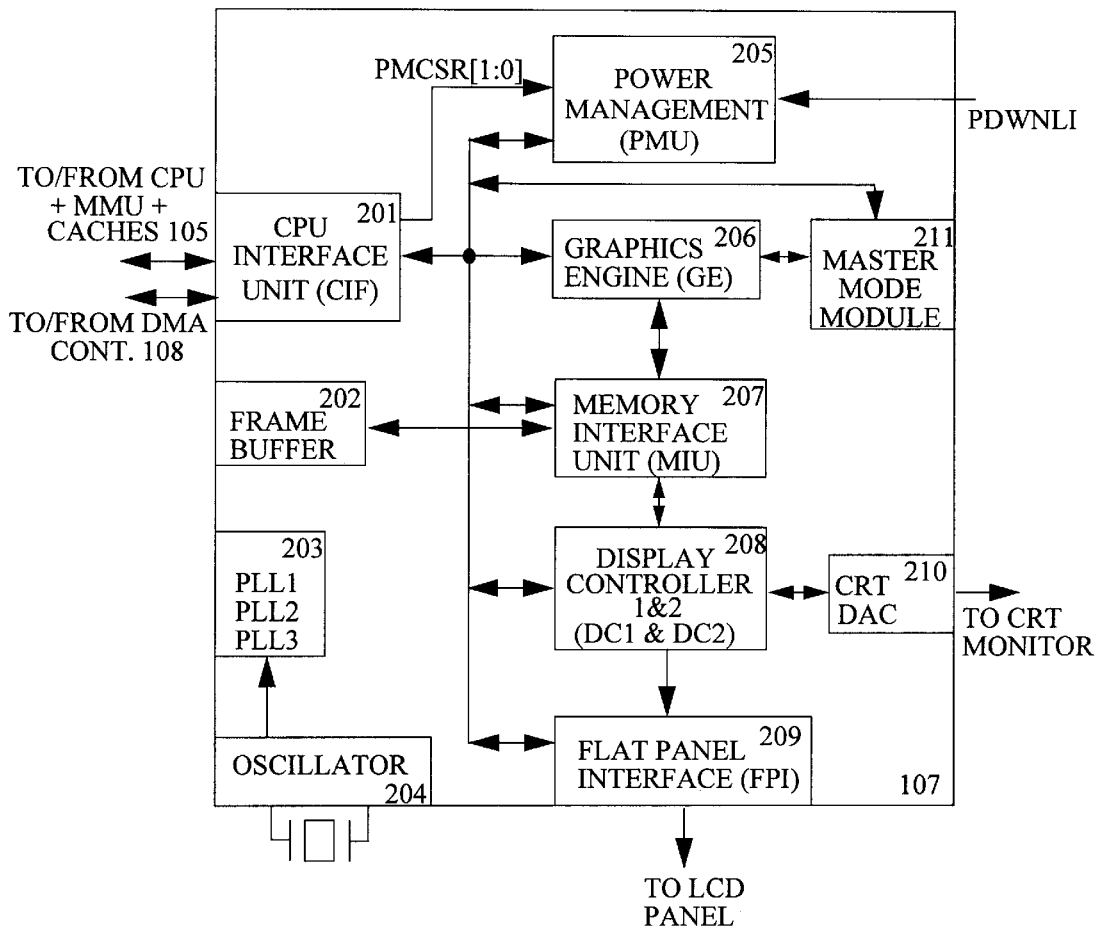
FIG. 2 is a block diagram illustrating in greater detail graphics/display controller 107 illustrated in FIG. 1.

In the preferred embodiment, the invention is implemented as part of graphics/display controller 107. To be more precise, the invention is implemented inside PMU 205 which is a component of graphics/display controller 107. Reference is now made to FIG. 2 illustrating graphics/display controller 107 in greater detail. In general, graphics/display controller 107 comprises CPU Interface Unit (CIF) 201, frame buffer, 202, Phase Lock Loop (PLL) circuit 203, oscillator 204, Power Management Unit (PMU) 205, Graphics Engine (GE) 206, Memory Interface Unit (MIU) 207, display controller 1&2 (DC1 & DC2) 208, Flat Panel Interface (FPI) 209, CRT Digital-to-Analog Converter (DAC) 210, and master mode module 211. CIF 201 provides the interface to processing unit 105 and DMA controller 108. Accordingly, CIF 201 routes requests and data received from processing unit 105 to the desired destination. In particular, CIF 201 sends register read/write requests and memory read/write requests from the host CPU processing unit 105 and DMA controller 108 to the appropriate modules in graphics/display controller 107. For example, memory read/write requests are passed on to MIU 207 which in turn reads/writes the data from/to frame buffer 202. CIF 201 also serves as the liaison with DMA controller 108 to fetch data from system memory (ROM 103 and RAM 104) and provides the data to GE 206 and MIU 207. Further, CIF 201 has a power mode register PMCSR that is programmable by the host CPU in processing unit 105 to control the power state of graphics/display controller 107.

Frame buffer 202 is used to store the display image as well to act as a temporary buffer for various purposes. Oscillator 204 provides a reference clock signal to PLL circuit 203 which in turn generates three programmable phase lock loop clock signals: PLL1, PLL2, and PLL3 for the different modules in graphics/display controller 107. More particularly, while clock signal PLL1 is used for GE 206 and MIU 207, clock signals PLL2 and PLL3 are used for display controller 1&2 (DC1 & DC2) 208. PMU 205 monitors PMCSR register in CIF 201 together with external signal PDWNLI to determine the desired power state. In turn, PMU 205 enables or disables the different modules as well as performs the required power-on and power-off sequence of the different modules as pertaining to a particular power state. GE 206 processes graphics image data stored in frame buffer 202 based on commands issued by the host CPU. Master mode module 211 allows GE 206 to fetch queued commands in system memory (ROM 103 and RAM 104) which are issued by the host CPU.

MIU 207 controls all read and write transactions from/to frame buffer 202. Such read and write requests may come from the host CPU via CIF 201, GE 206, display controller 1&2 (DC1 & DC2) 208, FPI 209 etc. Display controller 208 retrieves image data from frame buffer 202 via MIU 207 and serializes the image data into pixels before outputting them to FPI 209 or CRT DAC 210. Accordingly, display controller 1&2 208 generates the required horizontal and vertical display timing signals. If the display device involved is a LCD, pixel data from display controller 208 is sent to FPI 209 before being passed on to the LCD. In the preferred embodiment, display controller 1&2 208 comprises a display controller 1 (DC1) that is normally used for a flat panel display (FPD) and a display controller 2 (DC2) that is normally used for a CRT. FPI 209 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 209 formats the data to suit the type of display. Furthermore, FPI 209 allows color data to be converted into monochrome data in the event a monochrome LCD is used. Conversely, if the display device is a cathode ray tube (CRT), pixel data is provided to CRT digital-to-analog converter (DAC) 210 prior to being sent to the CRT. CRT DAC 210 converts digital pixel data from display controller 208 to analog Red Green and Blue (RGB) signals to be displayed on the CRT monitor.

Figure 3:
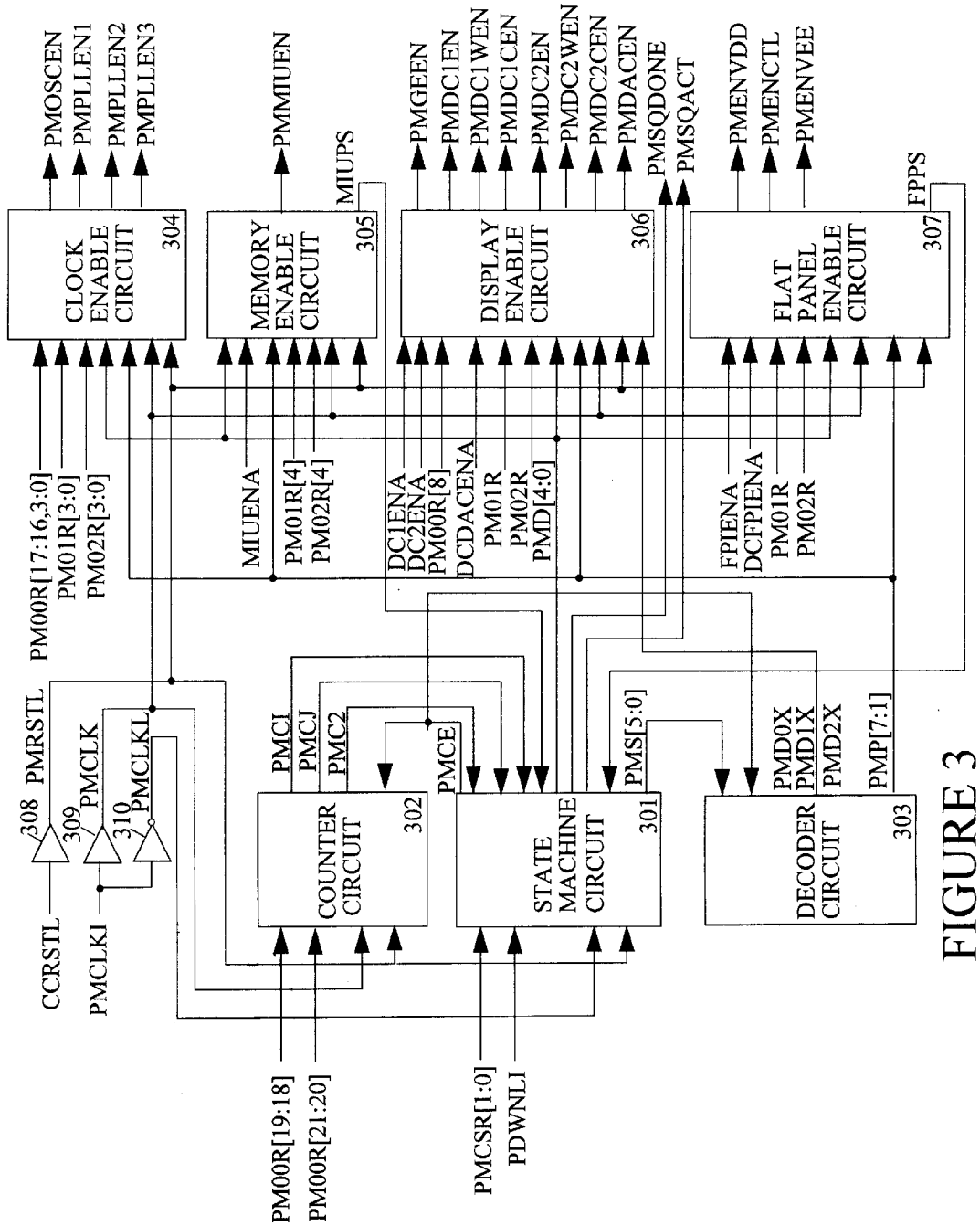
FIG. 3 is a block diagram illustrating in greater detail Power Management Unit 205 illustrated in FIG. 2.

Reference is now made to FIG. 3 illustrating in greater detail PMU 205 which implements the present invention. As shown in FIG. 3, PMU 205 includes state machine circuit 301, counter circuit 302, decoder 303, clock enable circuit 304, memory enable circuit 305, display enable circuit 306, flat panel enable circuit 307, buffers 308–309, and inverter 310. Chip reset signal CCRSTL is buffered by buffer 308 whose output signal PMRSTL is used to reset state machine to D3 state. Signal PMRSTL is provided as input to state machine circuit 301 and counter circuit 302. Power management clock signal PMCLKI is provided as input to buffer 309 and inverter 310 which in turn output signals PMCLK and PMCLKL, respectively. Accordingly, signal PMCLKL is the invert of signals PMCLKI and PMCLK. In the present embodiment, power management clock signal PMCLKI is approximately 16.384 kHz. Clock signals PMCLKL and PMCLK are provided as input to state machine circuit 301 and counter circuit 302, respectively. State machine circuit 301 is clocked on the rising edge of clock signal PMCLKL. All incoming signals of state machine circuit 301 are generated on the rising edge of clock signal PMCLK. The rising edge of signal PMCLK lags behind the rising edge of clock signal PMCLKL by 180 degrees. In so doing, sufficient set and hold time are provided for state machine circuit 301 to minimize problems associated with clock skew thereby allowing valid information carried by its incoming signals to be latched. In addition, the output signals of state machine circuit 301 and decoded output signals generated by decoder circuit 303 are latched at the rising edge of clock PMCLK by enable circuits 304–307.

Counter circuit 302 is used to determine the time interval between the disabling or enabling of two circuits or modules in power sequencing. Such time interval is required to ensure that a circuit/module is enabled or disabled properly. In accordance to the present invention, such time interval is programmable. Preferably, there are two main types of power sequencing intervals: general power sequencing interval (hereinafter $T_i$) and Flat Panel power sequencing interval (hereinafter $T_j$). In general, a flat panel power sequencing may be required as a part of a general power sequencing. Such flat panel power sequencing may be required because a flat panel display (FPD) normally has two or three power supplies that must be enabled in a certain order. As an example, for a FPD that requires two power supplies, a first power supply must be enabled, then the flat panel control signal and the flat panel data output signal must be enabled before the second power supply is enabled. The same counter can be used for both types of power sequencing interval because they occur at different times. Ti is controlled by bits PM00R[19:18] to have a duration of 16, 32, 64, or 128 PMCLK clock cycles. Tj is controlled by bits PM00R[21:20] to have a duration of 512, 1024, 2048, or 4096 PMCLK clock cycles. In the preferred embodiment, counter circuit 302 is further be used to determine the power sequence settling time which is the minimum waiting period between the end of a power up/power down sequencing and the next power up/power down sequencing. The power settling time is fixed to 4 PMCLK clock cycles.

State machine circuit 301 generates signal PMCE to enable or disable counter circuit 302. When enable signal PMCE is asserted HIGH, counter circuit 302 is enabled. Otherwise, when enable signal PMCE is deasserted LOW, counter circuit 302 is disabled after being reset. Clock signal PMCLK is used to drive counter circuit 302. The value of bits PM00R[19:18] is used to determine whether $T_i$ is to have a duration of 16, 32, 64, or 128 PMCLK clock cycles. The value of bits PM00R[21:20] is used to determine whether $T_j$ is to have a duration of 512, 1024, 2048, or 4096 PMCLK clock cycles. Accordingly, counter circuit 302 asserts signals PMCI and PMCJ, which are provided as inputs to state machine circuit 301, to indicate to state machine circuit 301 that intervals $T_i$ and $T_j$ have expired, respectively. Counter circuit 302 may further assert signal PMC2, which is also provided as input to state machine circuit 301, to indicate to state machine circuit 301 that counter circuit 302 has been enabled for 3 PMCLK clock cycles.

In general, state machine circuit 301 is used to determine and monitor the power states for PMU 205. Power state bits PMCSR[1:0] and signal PDWNLI, which are provided as inputs to state machine circuit 301, dictate the power state that PMU 205 is to be in. Bits PMCSR[1:0] and signal PDWNLI are decoded in state machine circuit 301 to generate power state signal PMD[4:0] which are actual inputs to state machine circuit 301. When the value of PMD[4:0] changes, it indicates that there is a change in power states and as a result, the power sequencing PM state machine will be triggered to execute a power sequencing to transition from an old power state to a new power state.

Figure 3A:
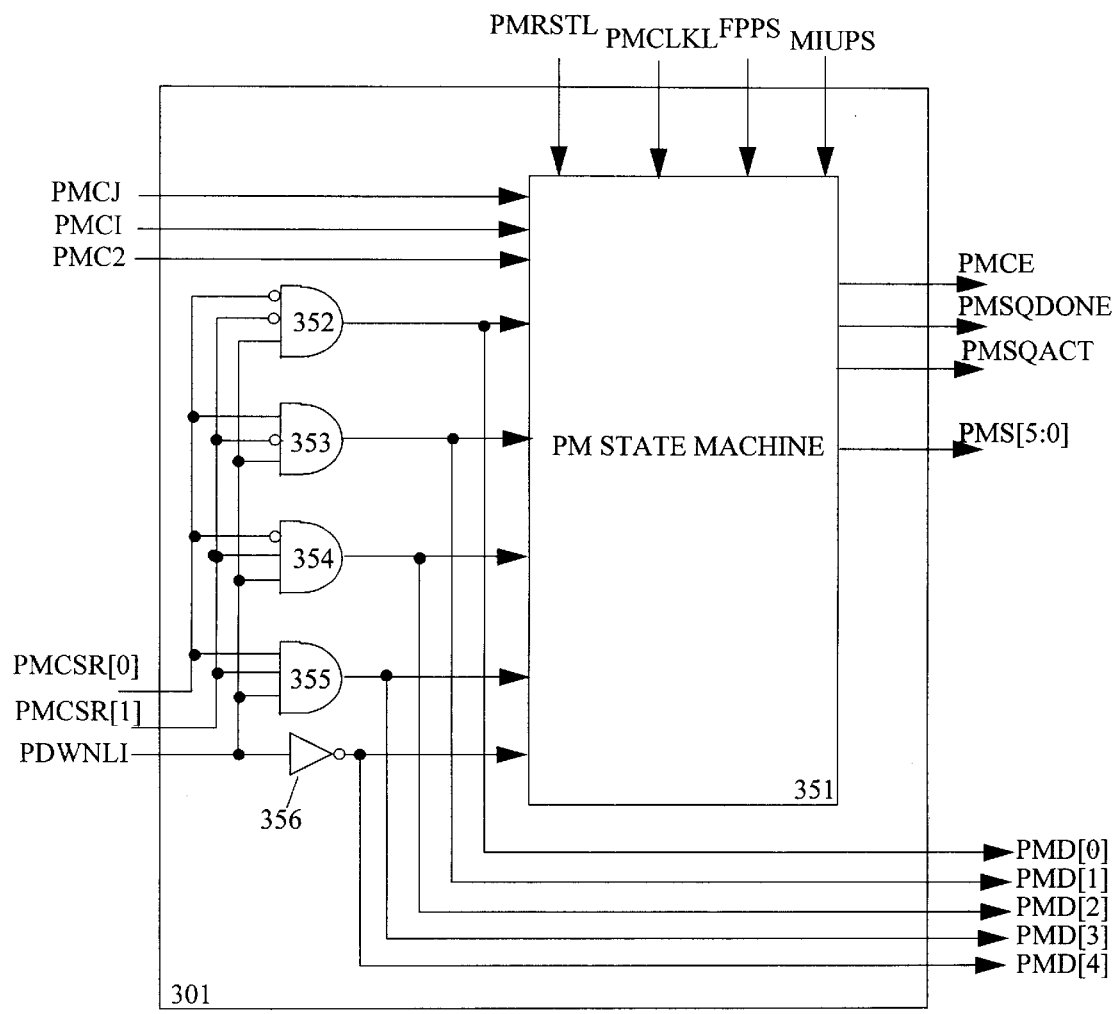
FIG. 3A is a diagram illustrating in greater detail state machine circuit 301 of FIG. 3.

Reference is now made to FIG. 3A illustrating in greater detail state machine circuit 301. As shown in FIG. 3A, state machine circuit 301 comprises PM state machine 351, AND-gates 352–355, and inverter 356. State machine circuit 301 receives input signals FPPS, MIUPS, PMCI, PMCJ, PMC2, PMCSR[1:0], PDWNLI, PMRSTL, and PMCLKL while provides output signals PMD[4:0], PMS[5:0], PMSQDONE, and PMSQACT. AND-gates 352–355 and inverter 356 combine to decode bits PMCSR[1:0] and signal PDWNLI to generate power state signal PMD[4:0]. More particularly, the invert of bit PMCSR[0], the invert of bit PMCSR[1], and bit PDWNLI are provided as input to AND-gate 352 which outputs bit PMD[0]. Bit PMCSR[0], the invert of bit PMCSR[1], and bit PDWNLI are provided as input to AND-gate 353 which outputs bit PMD[1]. The invert of bit PMCSR[0], bit PMCSR[1], and bit PDWNLI are provided as input to AND-gate 354 which outputs bit PMD[2]. Bit PMCSR[0], bit PMCSR[1], and bit PDWNLI are provided as input to AND-gate 355 which outputs bit PMD[3]. Bit PDWNLI is provided to inverter 356 which outputs bit PMD[4]. PM state machine 351 receives as inputs signal PMRSTL, PMCLKL, FPPS, MIUPS, PMCJ, PMCI, PMC2, and power state signal PMD[4:0]. As discussed in greater detail below, PM state machine 351 generates as output signals PMCE, PMSQDONE, PMSQACT, and PMS[5:0].

Table 1 below provides the different power states generated by decoding power state bits PMCSR[1:0] and signal PDWNLI.

TABLE 1

| PDWNLI | PMCSR [1:0] | PMD [4:0] | Power State Name |
|---|---|---|---|
| 1 | 00 | 00001 | D0 |
| 1 | 01 | 00010 | D1 |
| 1 | 10 | 00100 | D2 |
| 1 | 11 | 01000 | D3 |
| 0 | XX | 10000 | D4 |

As shown in Table 1, there are five possible power states D0–D4 supported by PMU 205 in accordance to the present invention. Under the preferred embodiment, D0 (i.e., PMD [4:0] is 00001) is a normal power state, D1 is a first register controlled programmable power state (i.e., PMD[4:0] is 00010), D2 is a second register controlled programmable power state (i.e., PMD[4:0] is 00100), D3 is a software-controlled sleep power state (i.e., PMD[4:0] is 01000), and D4 is a hardware-controlled sleep power state (i.e., PMD [4:0] is 10000). As suggested by its name, during the normal power state D0, display/graphics controller 107 is its normal functioning mode which generally means that all of its circuits and modules can be enabled (powered up). Power state D1 is a programmable power saving mode in which CIF 201 and PMU 205 are to be enabled while other circuits and modules in display/graphics controller 107 can be enabled or disabled as controlled by PM01R register. Because PM01R register is programmable by the user, the power sequencing associated with this power state is flexible in accordance to the present invention. Power state D2 is a second programmable power saving mode in which CIF 201 and PMU 205 are to be enabled while other circuits and modules in display/graphics controller 107 can be enabled or disabled as controlled by PM02R register. Because PM02R register is programmable by the user, the power sequencing associated with this power state is flexible in accordance to the present invention.

Power state D3 is a software controlled sleep mode in which power conservation is the objective. Accordingly, most circuits and modules in display/graphics controller 107 are disabled (powered down) including most sub-circuits in CIF 201. The only circuits and modules that remain enabled during power state D3 are the configuration registers in CIF 201, which contain PMCSR[1:0], and PMU 205. In addition, the memory refresh circuitry which is part of MIU 207 can be optionally enabled in D3 state as controlled by a programmable register bit. Preferably, power state D3 is the default state when display/graphics controller 107 is reset. Power state D4 is a hardware controlled sleep mode and the lowest power saving mode. To conserve power, practically all circuits and modules in display/graphics controller 107 are disabled (powered down) including all sub-circuits in CIF 201. The only module that remains enabled during power state D4 is PMU 205. Additionaly, the memory refresh circuitry which is part of MIU 207 can be optionally enabled in D4 state as controlled by a programmable register bit.

As shown in Table 1, input signal PWDNLI is used to control the hardware controlled sleep mode D4. When signal PWDNLI is HIGH, it is combined with different permutations of bits PMCSR[1:0] to form four different power states (D0–D3). When signal PWDNLI is LOW, it can be combined with any permutations of bits PMCSR[1:0] to form the remaining power state (D4).

PM state machine circuit 351 further receives as inputs signals MIUPS, FPPS, and PMRSTL. Signals MIUPS and FPPS are used to trigger power sequencing when MIU 207 or FPI 209 is enabled/disabled, respectively. PM state machine 351 also receives signal PMCI, PMCJ, and PMC2 which are outputs of counter circuit 302. Signal PMRSTL, which is active LOW, is used to reset PM state machine 351. In addition to outputting signal PMCE and power states signals PMD[4:0] as discussed earlier, PM state machine 351 further outputs signals PMS[5:0], PMSQDONE, and PMSQACT. While signal PMSQACT indicates that the current general power sequencing is occurring, signal PMSQDONE indicates that the current general power sequencing is complete. State encoding signal PMS[5:0] is used to indicate all the states in PM state machine 351. Table 2 provides the machine states of PM state machine 351.

TABLE 2

| State Name | State Encoding PMS [5:0] |
|---|---|
| S00 | 000000 |
| S01 | 000001 |
| S02 | 000010 |
| S03 | 000011 |
| S04 | 000100 |

TABLE 2-continued

| State Name | State Encoding PMS [5:0] |
|---|---|
| S05 | 000101 |
| S06 | 000110 |
| S07 | 000111 |
| S10 | 001000 |
| S11 | 001001 |
| S12 | 001010 |
| S13 | 001011 |
| S14 | 001100 |
| S15 | 001101 |
| S16 | 001110 |
| S17 | 001111 |
| S20 | 010000 |
| S21 | 010001 |
| S22 | 010010 |
| S23 | 010011 |
| S24 | 010100 |
| S25 | 010101 |
| S26 | 010110 |
| S27 | 010111 |
| S30 | 011000 |
| S31 | 011001 |
| S32 | 011010 |
| S33 | 011011 |
| S34 | 011100 |
| S35 | 011101 |
| S36 | 011110 |
| S37 | 011111 |
| S40 | 1xx000 |
| S41 | 1xx001 |
| S42 | 1xx010 |
| S43 | 1xx011 |
| S44 | 1xx100 |
| S45 | 1xY101 |
| S46 | 1xx110 |
| S47 | 1xx111 |

As shown in Table 2, there are five main states S00 (D0), S10 (D1), S20 (D2), S30 (D3), and S40 (D4). They are highlighted for emphasis. In the preferred embodiment, the five main states are represented (encoded) by the three most significant PMS bits (i.e., PMS[5:3]). In the current embodiment, for each of these main states, there are seven associated sub-states Sx1–Sx7 where x=0-to-4. However, it should be clear to a person of ordinary skill in the art that other sub-states may also be associated with each of the main power state. All the sub-states Sx1–Sx7 are represented (encoded) by the three least significant PMS bits (i.e., PMS[2:0]). The corresponding state encoding values for the main and sub states in the current embodiment, which are carried by state encoding signal PMS[5:0], are also provided in Table 2.

State encoding signal PMS[5:0] and enable signal PMCE are provided as inputs to decoder 303 which decodes these signals to generate status signals PMP[7:1], PMD0X, PMD1X, and PMD2X. Status signals PMP[7:1] are one-clock pulse signals indicating the beginning of the corresponding sub-states Sx1–Sx7 where x=0-to-4. Status signal PMD0X is asserted when PM state machine 351 is in states S00, S01, S02, S03, S04, S05, S06, and S07. Status signal PMD1X is asserted when PM state machine 351 is in states S10, S11, S12, S13, S14, S15, S16, and S17. Status signal PMD2X is asserted when PM state machine 351 is in states S20, S21, S22, S23, S24, S25, S26, and S27. Status signals PMP[7:1] are provided as inputs to clock enable circuit 304, memory enable circuit 305, display enable circuit 306, and flat panel enable circuit 307. Status signals PMD0X, PMD1X, and PMD2X are provided as inputs to display enable circuit 306.

In accordance to the present invention, miscellaneous control register PM00R, D1 control register PM01R, and D2 control register PM02R are used to control whether a particular circuit or module is to be enabled or disabled during a power sequencing. In general, the bits in these control registers are assigned to specific circuits/modules that are to be enabled or disabled. For example, bits 0–3 of miscellaneous control register PM00R may be used to enable (power up) or disable (power down) the clock oscillator (OSCCLK), PLL1, PLL2, and PLL3, respectively. Since the control registers are programmable by the user, it allows selected circuits/modules to be enabled or disabled as desired in a power sequence.

In general, clock enable circuit 304 generates enable signals for the oscillator, PLL1, PLL2, and PLL3. Clock enable circuit 304 receives as inputs signals PMCLK, PMRSTL, PM00R[17:16, 3:0], PM01R[3:0], and PM02R [3:0]. In addition, clock enable circuit 304 also receives as inputs signals PMD[4:0], PMP[7], and PMP[1]. In the preferred embodiment, bits 0–3 of miscellaneous control register PM00R (i.e., PM00R[0:3]) are used to enable (power up) or disable (power down) the clock oscillator (OSCCLK), PLL1, PLL2, and PLL3, respectively. Bits 16–17 of register PM00R (i.e., PM00R[17:16] are used to enable/disable memory refresh of the frame buffer 202 during state D3 and state D4, respectively. Bits 0–3 of D1 state control register PM01R are used to enable/disable the clock oscillator (OSCCLK), PLL1, PLL2, and PLL3, respectively, in D1 power state. Bits 0–3 of D2 state control register PM02R are used to enable/disable the clock oscillator (OSCCLK), PLL1, PLL2, and PLL3, respectively, in D2 power state.

Using power state signal PMD[4:0] representing the desired PMU power state (e.g., main state) as well as status bits PMP[7,1] representing the beginning of sub-states Sx7 and Sx1 where x=0-to-4, clock enable circuit 304 determines whether to asserts enable signals PMOSCEN, PMPLL1EN, PMPLL2EN, and PMPLL3EN. Moreover, if these enable signals are to be asserted, clock enable circuit 304 determines the proper sequence that these enable signals are to be asserted. Signal PMRSTL is used to reset clock enable circuit 304. Clock signals PMCLK are used to synchronize and latch propagating signals in clock enable circuit 304.

Memory enable circuit 305 generates enable signals for the MIU, internal memory refresh, and internal memory restricted refresh. Memory enable circuit 305 receives as inputs signals PMCLK, PMRSTL, PM01R[4], PM02R[4], and MIUENA signal. In addition, memory enable circuit 305 also receives as inputs signals PMD[2:0], PMP[6], and PMP[2]. In the preferred embodiment, MIUENA is a register bit. When bit MIUENA is HIGH, it indicates that MIU 207 is enabled (if MIU 207 can be enabled in the present power state). When bit MIUENA is LOW, it indicates that MIU 207 is disabled. Bit 4 of D1 state control register PM01R is used to enable/disable MIU 207 in D1 power state. Bit 4 of D2 state control register PM02R is used to enable/disable MIU 207 in D2 power state.

Using power state signal PMD[2:0] representing the desired power state (e.g., main state) as well as status bits PMP[6,2] representing the status of sub-states Sx6 and Sx2 where x=0-to-4, and MIUENA signal, memory enable circuit 305 determines whether to asserts enable signal PMMI-UEN. Memory enable circuit 305 further generates signal MIUPS. Signal MIUPS is asserted HIGH when MIU 207 is enabled/disabled to indicate that MIU power sequencing is needed. More particularly, if MIU 207 is enabled, a power up sequencing is needed. If MIU 207 is disabled, a power down sequencing is needed. Signal PMRSTL is used to reset memory enable circuit 305. Clock signal PMCLK is used to synchronize and latch propagating signals in memory enable circuit 305.

Display enable circuit 306 generates enable signals for GE 206, display controller 208, and CRT DAC 210. Display enable circuit 306 receives as inputs signals PMCLK, PMRSTL, PM00R[8], PM01R[27,25,24,19,17,16,8,6], and PM02R[27,25,24,19,17,16,8,6]. In addition, display enable circuit 306 also receives as inputs signals PMD[2:0], PMP[3,5], PMD0X, PMD1X, and PMD2X. In the preferred embodiment, bit 8 of miscellaneous control register PM00R (i.e., PM00R[8]) is used to enable/disable GE 206 if GE 206 can be enabled in the present power state. Bits 6, 8, 16, 17, 19, 24, 25, and 27 of D1 state control register PM01R are used to enable/disable GE 206, CRT DAC 210, display controller 1, window 1 sub-module, cursor 1 sub-module, display controller 2, window 2 sub-module, and cursor 2 sub-module in D1 power state. Similarly, bits 6, 8, 16, 17, 19, 24, 25, and 27 of D2 state control register PM02R are used to enable/disable GE 206, CRT DAC 210, display controller 1, window 1 sub-module, cursor 1 sub-module, display controller 2, window 2 sub-module, and cursor 2 sub-module in D2 power state. Bits PMD0X, PMD1X, and PMD2X, when asserted, indicate whether state machine circuit 301 is in a main state or is transitioning to the D0, D1, and D2 main state, respectively.

Using power state signal PMD[2:0] representing the desired PMU power state (e.g., main state), status bits PMP[3,5] representing the beginning of sub-states Sx3and Sx5where x=0-to-4, signal DCDACENA, signal DC1ENA, and signal DC2ENA, display enable circuit 306 determines whether to asserts enable signals PMGEEN, PMDACEN, PMDC1EN, and PMDC2EN. Moreover, using status signals PMD0X, PMD1X, PMD2X, display enable circuit 306 determines whether to asserts enable signals PMDC1WEN , PMDC1CEN, PMDC2WEN , and PMDC2CEN . More particularly, enable signals for the display controller 1 of display controller 208 include: PMDC1EN, PMDC1WEN, and PMDC1CEN. Enable signals for the display controller 2 of display controller 208 include: PMDC2EN , PMDC2WEN , and PMDC2CEN . If the enable signals above are to be asserted or deasserted, display enable circuit 306 determines the proper sequence that these enable signals are to be asserted. Signal DCDACENA is used to enable CRT DAC 210 when CRT DAC 210 can be enabled in the current power state. Signals DC1ENA and DC2ENA indicate whether the display controller 1 and the display controller 2 are to be enabled, respectively. Signal PMRSTL is used to reset display enable circuit 306. Clock signal PMCLK is used to synchronize and latch propagating signals in display enable circuit 306.

Flat Panel enable circuit 307 generates enable signals for FPI 209, flat panel power sequencing, and PWM enable. Flat panel enable circuit 307 receives as inputs signals PMCLK, PMRSTL, PM01R[9], PM02R[9], FPIENA, and DCFPIENA. In addition, flat panel enable circuit 307 also receives as inputs signals PMD[2:0] and PMP[5:3]. In the preferred embodiment, bit 9 of D1 control register PM01R (i.e., PM01R[9]) is used to enable/disable the flat panel display in the D1 power state. Similarly, bit 9 of D2 control register PM02R (i.e., PM02R[9]) is used to enable/disable the flat panel display in the D2 power state. FPIENA and DCFPIENA are control bits. When bit FPIENA is HIGH, it indicates that FPI 209 is enabled if FPI 209 can be enabled in the current power state. When bit DCFPIENA is HIGH, it indicates that either DC1 or DC2 of display controller 1&2 208, which is selected to drive FPI 209, is enabled.

Using power state signal PMD[2:0] representing the desired power state (e.g., main state), signal FPIENA, signal DCFPIENA, as well as status bits PMP[5:3] representing the beginning of sub-states Sx3, Sx4, and Sx5 where x=0-to-4, flat panel enable circuit 307 determines whether to asserts enable signals PMENVDD, PMENCTL, and PMENVEE. The enable signal for FPI 209 is PMENCTL. The enable signals for flat panel power sequencing include PMENVDD, PMENCTL, and PMENVEE. If these enable signals are to be asserted, flat panel enable circuit 307 determines the proper sequence that these enable signals are to be asserted. Flat panel enable circuit 307 further generates signal FPPS which is asserted HIGH when the flat panel display is enabled or disabled to indicate that flat panel power sequencing is needed. Signal PMRSTL is used to reset flat panel enable circuit 307. Clock signal PMCLK is used to synchronize and latch propagating signals in flat panel enable circuit 307.

Figure 4:
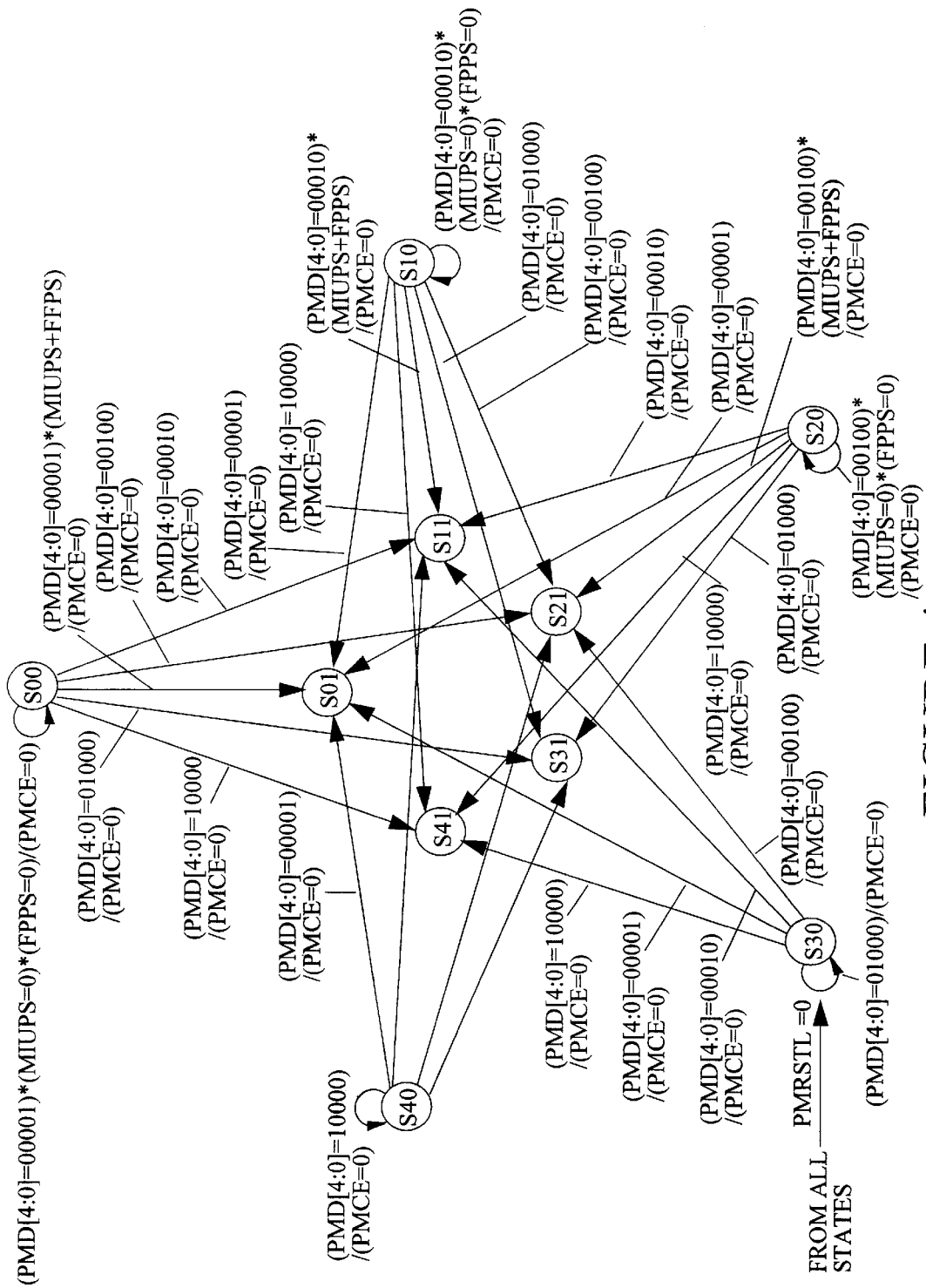
FIG. 4 is a first state diagram illustrating some of the relevant states performed by PM state machine 351 illustrated in FIG. 3A.

FIG. 4 is a state diagram which illustrates some of the relevant states in PM state machine 351 that was illustrated in Table 2. In the preferred embodiment, no matter what PM state machine 351 may be in at the time, state S30 (D3) becomes the default state whenever reset signal PMRSTL is asserted LOW. From state S30, PM state machine 351 monitors power state signal PMD[4:0] to determine whether the power state has changed. If signal PMD[4:0] has the binary value 01000 indicating that the desired power state is D3, PM state machine 351 remains in state S30. If signal PMD[4:0] changes to binary value of 10000 indicating that the desired power state is D4, PM state machine 351 deasserts signal PMCE to disable counter circuit 302 and switches to state S41. If signal PMD[4:0] changes to binary value of 00001 indicating that the desired power state is D0, PM state machine 351 deasserts signal PMCE to disable counter circuit 302 and switches to state S01. If signal PMD[4:0] changes to binary value of 00010 indicating that the desired power state is D1, PM state machine 351 deasserts signal PMCE to disable counter circuit 302 and switches to state S11. Finally, if signal PMD[4:0] changes to binary value of 00100 indicating that the desired power state is D2, PM state machine 351 deasserts signal PMCE to disable counter circuit 302 and switches to state S21.

If PM state machine 351 is currently engaged in state S40 (D4), PM state machine 351 monitors power state signal PMD[4:0] to determine whether the power state has changed. If signal PMD[4:0] has the binary value 10000 indicating that the desired power state is D4, PM state machine 351 remains in state S40. If signal PMD[4:0] changes to binary value of 00001 indicating that the desired power state is D0, PM state machine 351 deasserts signal PMCE to disable counter circuit 302 and switches to state S01. If signal PMD[4:0] changes to binary value of 00010 indicating that the desired power state is D1, PM state machine 351 deasserts signal PMCE to disable counter circuit 302 and switches to state S11. If signal PMD[4:0] changes to binary value of 00100 indicating that the desired power state is D2, PM state machine 351 deasserts signal PMCE to disable counter circuit 302 and switches to state S21. Finally, if signal PMD[4:0] changes to binary value of 01000 indicating that the desired power state is D3, PM state machine 351 deasserts signal PMCE to disable counter circuit 302 and switches to state S31.

If PM state machine 351 is currently engaged in state S00 (D0), PM state machine 351 monitors power state signal PMD[4:0] to determine whether the power state has changed as well as monitors signal MIUPS and FPPS to determine whether MIU or flat panel power sequencing needs to be initiated. If signal PMD[4:0] has the binary value of 00001 indicating that the desired power state is D0, PM state machine 351 next monitors signals MIUPS and FPPS to determine whether MIU or FPI is being enabled/disabled therefore requiring power sequencing. In the event either a MIU power sequencing or a flat panel power sequencing is required, PM state machine 351 deasserts signal PMCE to disable counter circuit 302 and switches to state S01. Otherwise, if signal PMD[4:0] has the binary value 00001 indicating that the desired power state is D0 and signals MIUPS and FPPS are deasserted indicating that neither MIU nor flat panel sequencing is needed, PM state machine 351 remains in state S00.

If signal PMD[4:0 ] changes to binary value of 10000 indicating that the desired power state is D4, PM state machine 351 deasserts signal PMCE to disable counter circuit 302 and switches to state S41. If signal PMD[4:0] changes to binary value of 01000 indicating that the desired power state is D3, PM state machine 351 deasserts signal PMCE to disable counter circuit 302 and switches to state S31. If signal PMD[4:0] changes to binary value of 00100 indicating that the desired power state is D2, PM state machine 351 deasserts signal PMCE to disable counter circuit 302 and switches to state S21. Finally, if signal PMD[4:0] changes to binary value of 00010 indicating that the desired power state is D1, PM state machine 351 deasserts signal PMCE to disable counter circuit 302 and switches to state S11.

If PM state machine 351 is currently engaged in state S10 (D1), PM state machine 351 monitors power state signal PMD[4:0] to determine whether the power state has changed as well as monitors signal MIUPS and FPPS to determine whether MIU or flat panel power sequencing needs to be initiated. If signal PMD[4:0] has the binary value of 00010 indicating that the desired power state is D1, PM state machine 351 next monitors signals MIUPS and FPPS to determine whether a MIU power sequencing or a flat panel power sequencing is needed. In the event either a MIU power sequencing or a flat panel power sequencing is required, PM state machine 351 deasserts signal PMCE to disable counter circuit 302 and switches to state S11. Otherwise, if signal PMD[4:0] has the binary value of 00010 indicating that the desired power state is D1 and signals MIUPS and FPPS are deasserted indicating that neither MIU nor flat panel sequencing is needed, PM state machine 351 remains in state S10.

If signal PMD[4:0] changes to binary value of 00001 indicating that the desired power state is D0, PM state machine 351 deasserts signal PMCE to disable counter circuit 302 and switches to state S01. If signal PMD[4:0] changes to binary value of 10000 indicating that the desired power state is D4, PM state machine 351 deasserts signal PMCE to disable counter circuit 302 and switches to state S41. If signal PMD[4:0] changes to binary value of 01000 indicating that the desired power state is D3, PM state machine 351 deasserts signal PMCE to disable counter circuit 302 and switches to state S31. Finally, if signal PMD[4:0] changes to binary value of 00100 indicating that the desired power state is D2, PM state machine 351 deasserts signal PMCE to disable counter circuit 302 and switches to state S21.

If PM state machine 351 is currently engaged in state S20 (D2), PM state machine 351 monitors power state signal PMD[4:0] to determine whether the power state has changed as well as monitors signal MIUPS and FPPS to determine whether MIU or flat panel power sequencing needs to be initiated. If signal PMD[4:0] has the binary value of 00100 indicating that the desired power state is D2, PM state machine 351 next monitors signals MIUPS and FPPS to determine whether a MIU power sequencing or a flat panel power sequencing is needed. In the event either a MIU power sequencing or a flat panel power sequencing is required, PM state machine 351 deasserts signal PMCE to disable counter circuit 302 and switches to state S21. Otherwise, if signal PMD[4:0] has the binary value 00100 indicating that the desired power state is D2 and signals MIUPS and FPPS are deasserted indicating that neither MIU nor flat panel sequencing is needed, PM state machine 351 remains in state S20.

If signal PMD[4:0] changes to binary value of 01000 indicating that the desired power state is D3, PM state machine 351 deasserts signal PMCE to disable counter circuit 302 and switches to state S31. If signal PMD[4:0] changes to binary value of 10000 indicating that the desired power state is D4, PM state machine 351 deasserts signal PMCE to disable counter circuit 302 and switches to state S41. If signal PMD[4:0] changes to binary value of 00001 indicating that the desired power state is D0, PM state machine 351 deasserts signal PMCE to disable counter circuit 302 and switches to state S01. Finally, if signal PMD[4:0] changes to binary value of 00010 indicating that the desired power state is D1, PM state machine 351 deasserts signal PMCE to disable counter circuit 302 and switches to state S11.

Figure 5:
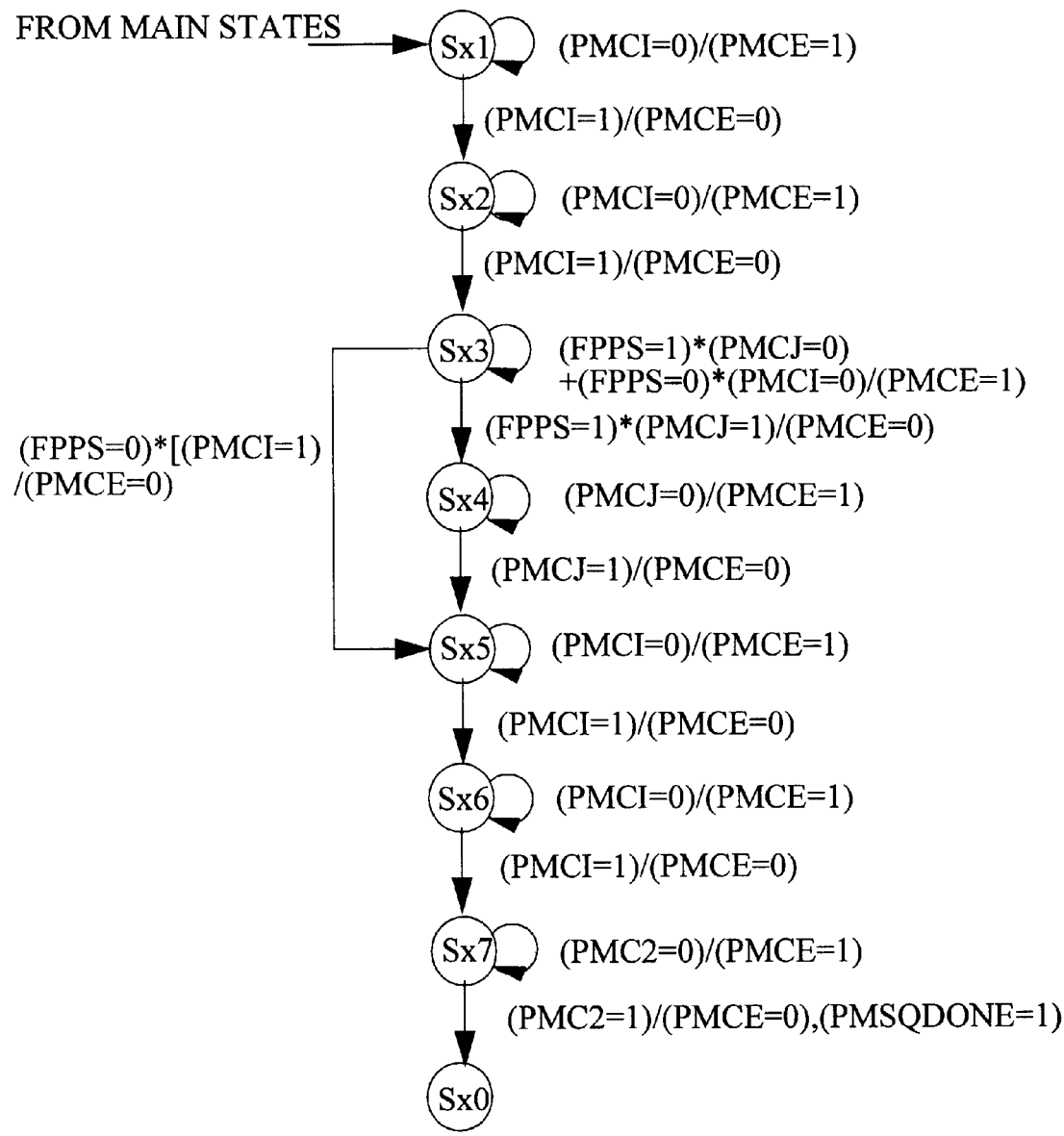
FIG. 5 is a second state diagram illustrating other relevant states performed by PM state machine 351 illustrated in FIG. 3A.

Reference is now made to FIG. 5 illustrating a continuation state diagram of the states in PM state machine 351. More specifically, FIG. 5 picks up where FIG. 4 leaves off when sub-states S01, S11, S21, S31, and S41 are reached. It is to be appreciated that all the states in FIGS. 4–5 are carried out by PM state machine 351. However, for the sake of clarity, these states are separated into two separate FIGS. 4 and 5. In FIG. 5, the variable x can be any value between 0–4. For example, depending on the value of x, Sx1 may be sub-state S01, S11, S21, S31, and S41. As shown in FIG. 5, the sub-states in FIG. 5 make up a sequential sequence (Sx1–Sx7) before going back to the main state (Sx0). In short, the sub-states illustrated in FIG. 5 represent a general power sequencing when transitioning to a corresponding main power state (e.g., S00 (D0), S10 (D1), S20 (D2), S30 (D3), and S40 (D4)).

As such, when sub-state Sx1 is arrived at from a main state according to the state diagram in FIG. 4, PM state machine 351 monitors signal PMCI which indicates whether the general power sequencing interval $T_i$ has expired. PM state machine 351 remains in sub-state Sx1 until the power sequencing interval $T_i$ expires. As discussed earlier, general power sequencing interval $T_i$ provides the necessary time for circuits/modules, that are not related to flat panel power sequencing, to be disabled or enabled properly. If signal PMCI is deasserted indicating that power sequencing interval $T_i$ is still going on, PM state machine 351 ensures that signal PMCE is set HIGH to enable counter circuit 302 and remains in sub-state Sx1. Otherwise, if signal PMCI is asserted indicating that power sequencing interval $T_i$ has expired, PM state machine 351 sets signal PMCE LOW to disable and reset counter circuit 302 and switches to the next sub-state Sx2 in the power sequencing. Like in the previous sub-state Sx1, PM state machine 351 remains in sub-state Sx2 until the power sequencing interval $T_i$ expires. When the power sequencing interval $T_i$ expires as indicated by signal PMCI being asserted HIGH, PM state machine 351 sets signal PMCE LOW to disable and reset counter circuit 302 and switches to the next sub-state Sx3 in the general power sequencing.

During a general power sequencing, a flat panel power sequencing may be required. As such, for sub-state Sx3, PM state machine 351 monitors signal FPPS and PMCJ in additional to signals PMCI. As discussed earlier, when asserted HIGH, signal FPPS indicates that a flat panel power sequencing is required. When asserted HIGH, signal PMCJ indicates that flat panel power sequencing interval $T_j$ has expired. PM state machine 351 remains in state Sx3 if signal FPPS is HIGH but signal PMCJ is LOW. Likewise, PM state machine 351 remains in state Sx3 if signals FPPS and PMCI are both LOW. Conversely, when both signals FPPS and PMCJ are both HIGH, machine state 301 switches to the next sub-state Sx4 in the power sequence. When signal FPPS is LOW but signal PMCI is HIGH, PM state machine 351 skips to sub-state Sx5. Signal PMCE is set HIGH when PM state machine 351 remains in Sx3 state and it is set LOW when PM state machine 351 goes from state Sx3 to either Sx4 or Sx5 state.

Sub-state Sx4 is used only for flat panel power sequencing. Accordingly, during sub-state Sx4, PM state machine 351 monitors signal PMCJ to determine when the flat panel power sequencing interval $T_j$ expires. Before flat panel power sequencing interval $T_j$ expires as indicated by signal PMCJ being LOW, PM state machine 351 remains in sub-state Sx4. After flat panel power sequencing interval $T_j$ expires as indicated by signal PMCJ being HIGH, PM state machine 351 resets signal PMCE to LOW before switching to the next sub-state in the power sequencing. In sub-state Sx5, PM state machine 351 continues the general power sequencing. PM state machine 351 remains in sub-state Sx5 until the power sequencing interval $T_i$ expires. When the power sequencing interval $T_i$ expires as indicated by signal PMCI being asserted HIGH, PM state machine 351 sets signal PMCE LOW to disable and reset counter circuit 302 before switching to the next sub-state Sx6 in the general power sequencing. Sub-state Sx6, is substantially similar to sub-state Sx5 in that PM state machine 351 remains in sub-state Sx5 until the power sequencing interval $T_i$ expires. When the power sequencing interval $T_i$ expires as indicated by signal PMCI being asserted HIGH, PM state machine 351 sets signal PMCE LOW to disable counter circuit 302 before switching to the next sub-state Sx7 in the general power sequencing.

Sub-state Sx7 is the last sub-state in the general power sequencing before PM state machine 351 switches back to a corresponding main state. Accordingly, PM state machine 351 monitors signal PMC2 which is used for transition from sub-state Sx7 back to sub-state Sx0. In the preferred embodiment, the duration of sub-state Sx7 is 4 clocks which provides a sufficient interval between sub-state Sx7 and sub-state Sx0 to ensure that PM state machine 351 is not reactivated too fast after it finishes the power sequencing thereby allowing time to update the associated status signal. Accordingly, if PMC2 is LOW indicating that the four-clock interval has not expired, PM state machine 351 remains in sub-state Sx7. When the four-clock interval expires as indicated by signal PMC2 being HIGH, PM state machine 351 sets signal PMCE LOW to disable and reset counter circuit 302 and signal PMSQDONE HIGH to indicate that the current general power sequencing is complete before switching back to main state Sx0.

Figure 6:
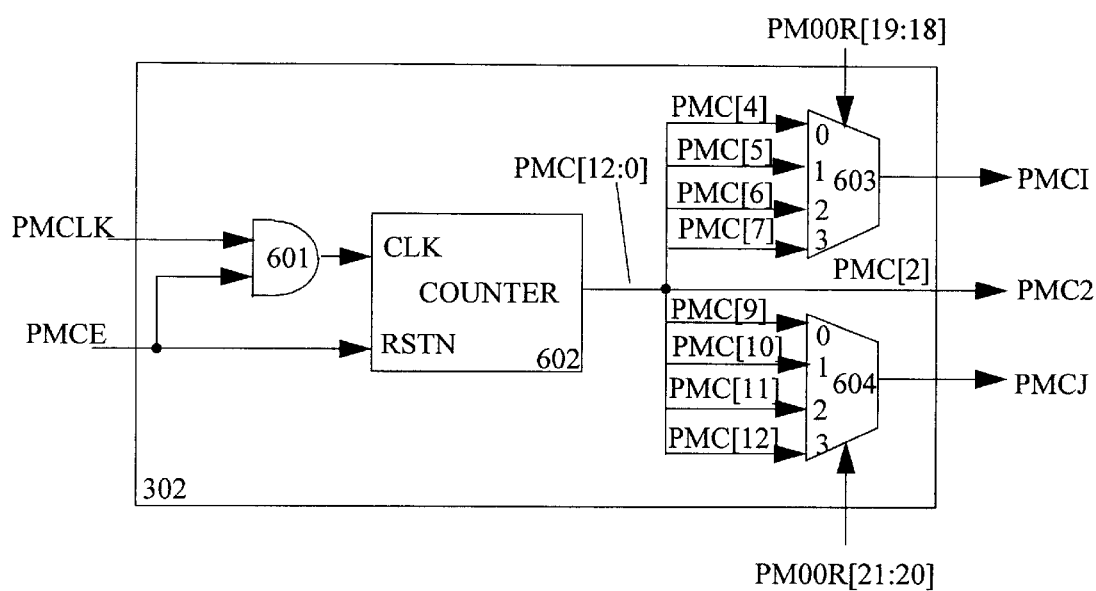
FIG. 6 is a block diagram illustrating in greater detail an embodiment of counter circuit 302 illustrated in FIG. 3.

Referring now to FIG. 6 illustrating in greater detail an embodiment of counter circuit 302. Counter circuit 302 comprises an AND-gate 601, a 13-bit counter 602, and multiplexers 603–604. AND-gate 601 receives as inputs clock signal PMCLK and enable signal PMCE from PM state machine 351. The output of AND-gate 601 is connected to counter 602. Bits 4–7 of counter 602 are supplied as inputs to multiplexer 603. Bits 9–12 of counter 602 are supplied as inputs to multiplexer 604. Bit 2 of counter 602 provides signal PMC2. Accordingly, signal PMC2 is HIGH when signal PMCE has been active for 3 clocks. Multiplexers 603 and 604 output signals PMCI and PMCJ, respectively. Clock signal PMCLK is passed through to counter 602 only when enable signal PMCE is asserted which then triggers counter 602 to count each clock cycle. Counter 602 is reset to one (1) whenever enable signal PMCE is deasserted. Bits PM00R[19:18] and PM00R[21:20] are used to control the count values output by multiplexers 603 and 604.

Figure 7:
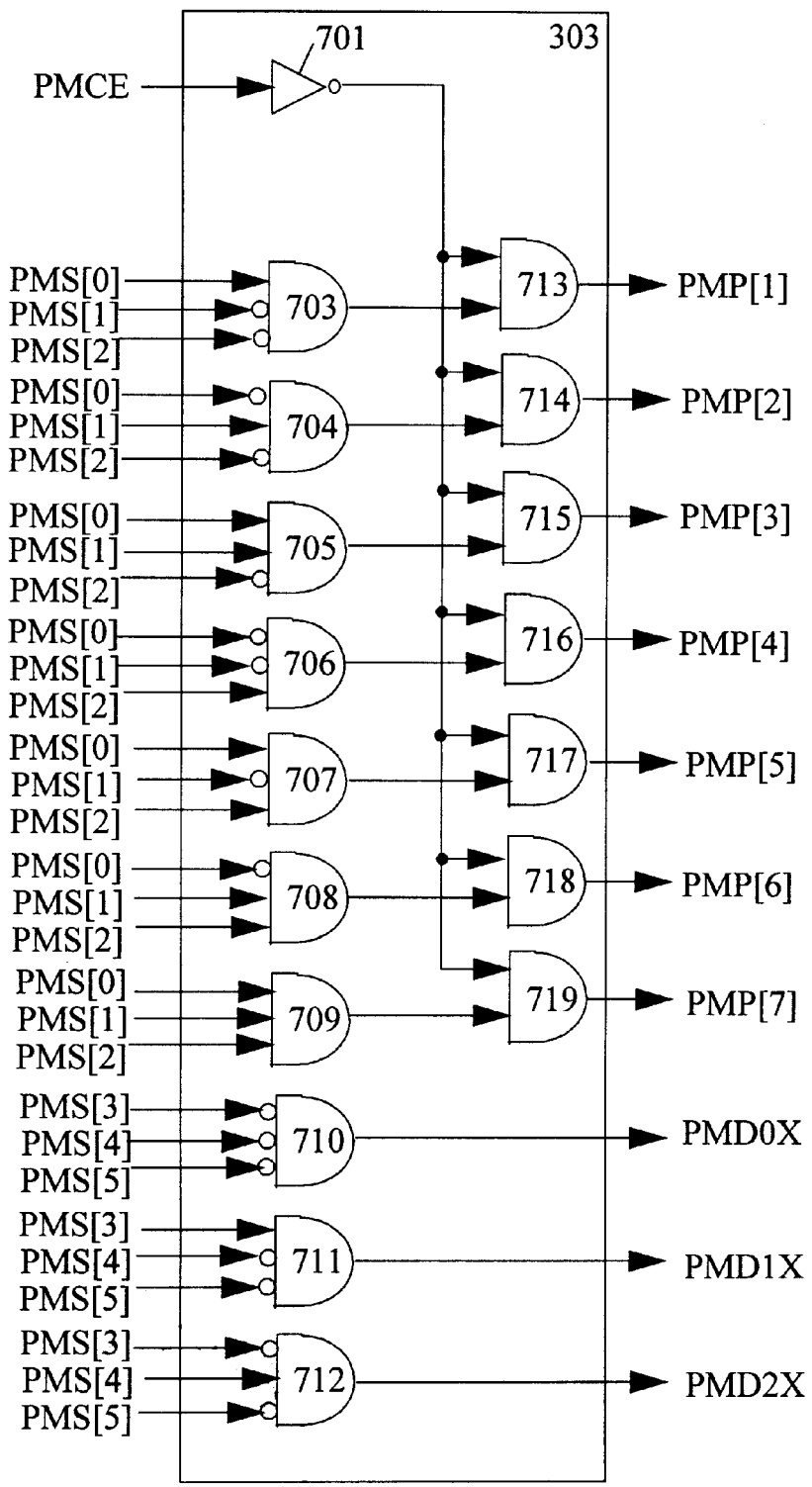
FIG. 7 is a block diagram illustrating in greater detail an embodiment of decoder circuit 303 illustrated in FIG. 3.

FIG. 7 illustrates in greater detail an embodiment of decoder circuit 303. Decoder circuit comprises inverter 701 and AND-gates 703–719. Enable signal PMCE is provided as an input to inverter 701 whose output is provided as an input to AND-gates 713–719 respectively. Bit PMS[0], the invert of bit PMS[1], and the invert of bit PMS[2] are provided as inputs to AND-gate 703. The output of AND-gate 703 is provided as the second input to AND-gate 713. In so doing, AND-gates 703 and 713 combine to activate bit PMP[1] HIGH only when bits PMS[2:0] have the binary value '001' and enable signal PMCE is deasserted. The invert of bit PMS[0], bit PMS[1], and the invert of bit PMS[2] are provided as inputs to AND-gate 704. The output of AND-gate 704 is provided as the second input to AND-gate 714. In so doing, AND-gates 704 and 714 combine to activate bit PMP[2] only when bits PMS[2:0] have the binary value '010' and enable signal PMCE is deasserted. Bit PMS[0], bit PMS[1], and the invert of bit PMS[2] are provided as inputs to AND-gate 705. The output of AND-gate 705 is provided as the second input to AND-gate 715. In so doing, AND-gates 705 and 715 combine to activate bit PMP[3] only when bits PMS[2:0] have the binary value '011' and enable signal PMCE is deasserted. The invert of bit PMS[0], the invert of bit PMS[1], and bit PMS[2] are provided as inputs to AND-gate 706. The output of AND-gate 706 is provided as the second input to AND-gate 716. In so doing, AND-gates 706 and 716 combine to activate bit PMP[4] only when bits PMS[2:0] have the binary value '100' and enable signal PMCE is deasserted. Bit PMS[0], the invert of bit PMS[1], and bit PMS[2] are provided as inputs to AND-gate 707. The output of AND-gate 707 is provided as the second input to AND-gate 717. In so doing, AND-gates 707 and 717 combine to activate bit PMP[5] only when bits PMS[2:0] have the binary value '101' and enable signal PMCE is deasserted. The invert of bit PMS[0], bit PMS[1], and bit PMS[2] are provided as inputs to AND-gate 708. The output of AND-gate 708 is provided as the second input to AND-gate 718. In so doing, AND-gates 708 and 718 combine to activate bit PMP[6] only when bits PMS[2:0] have the binary value '110' and enable signal PMCE is deasserted. Finally, bit PMS[0], bit PMS[1], and bit PMS[2] are provided as inputs to AND-gate 709. The output of AND-gate 709 is provided as the second input to AND-gate 719. In so doing, AND-gates 709 and 719 combine to activate bit PMP[7] only when bits PMS[2:0] have the binary value '111' and enable signal PMCE is deasserted. In so doing, PMP[1] is a one clock pulse that is generated in the first clock cycle in sub-state Sx1 (where x=0,1,2,3, and 4). Similarly, PMP[2]–PMP[7] are also one clock pulses that are generated in the first clock cycles in sub-states Sx2 –Sx7 (where x=0,1,2,3, and 4), respectively.

The inverts of bits PMS[3], PMS[4], and PMS[5] are provided as inputs to AND-gate 710 whose output is signal PMD0X. Accordingly, signal PMD0X is active HIGH when in state S0x (where x=0,1,2,3,4,5,6, and 7). Bit PMS[3], the invert of bit PMS[4], and the invert of bit PMS[5] are provided as inputs to AND-gate 711 whose output is signal PMD1X. Accordingly, signal PMD1X is active HIGH when in state S1x (where x=0,1,2,3,4,5,6, and 7). Finally, the invert of bit PMS[3], PMS[4], and the invert of bit PMS[5] are provided as inputs to AND-gate 712 whose output is signal PMD2X. Accordingly, signal PMD2X is active HIGH when in state S2x (where x=0,1,2,3,4,5,6, and 7).

Figure 8:
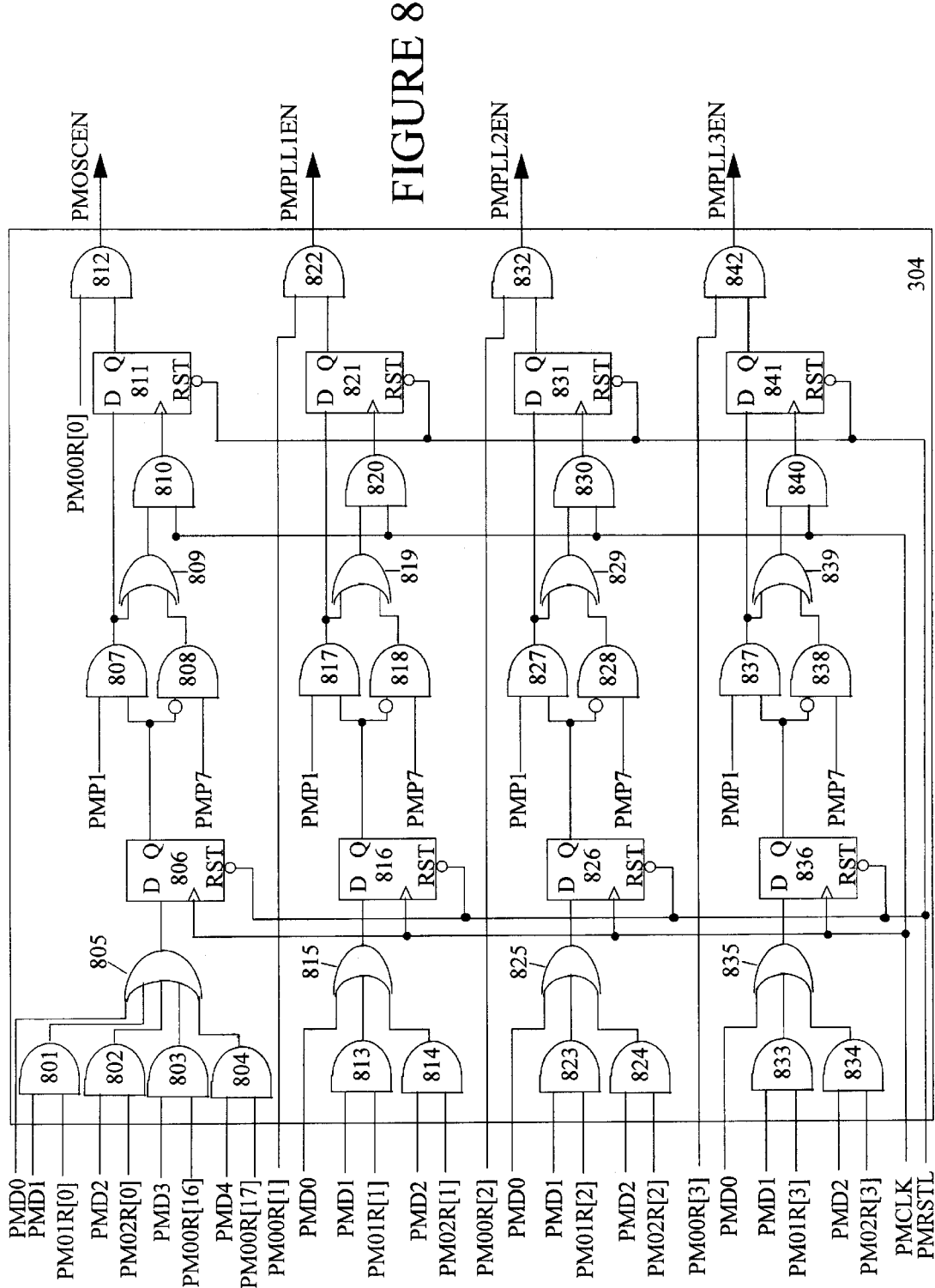
FIG. 8 is a block diagram illustrating in greater detail an embodiment of clock enable circuit 304 illustrated in FIG. 3.

FIG. 8 illustrates in greater detail an embodiment of clock enable circuit 304. Clock enable circuit 304 consists of four sub-circuits that are designed to generate oscillator enable signals PMOSCEN, PLL1 enable signal PMPLL1EN, PLL2 enable signal PMPLL2EN, and PLL3 enable signal PMPLL3EN. The three sub-circuits that are used to generate PLL1 enable signal PMPLL1EN, PLL2 enable signal PMPLL2EN, and PLL3 enable signal PMPLL3EN are identical to each other in terms of construction. As such, for brevity and clarity, only a detailed description of the sub-circuit used to generate PLL1 enable signal PMPLL1EN is provided here since this description is equally applicable to the sub-circuits used to generate PLL2 enable signal PMPLL2EN, and PLL3 enable signal PMPLL3EN except that their inputs are different.

The sub-circuit to generate PLL1 enable signal PMPLL1EN comprises AND-gates 813–814, OR-gate 815, D-type flip-flop 816, AND-gates 817–818, OR-gate 819, AND-gate 820, D-type flip-flop 821, and AND-gate 822. AND-gate 813 receives as inputs bit PMD1 and PM01R[1]. Bit PMD1 is used to indicate whether PM state machine 351 is currently in or is transitioning to state D1. Bit PM01R[1] indicates whether PLL1 can be enabled in state D1. Hence, only when PM state machine 351 is currently in or is transitioning to state D1 and PLL1 can be enabled in state D1, AND-gate 813 outputs a HIGH signal. AND-gate 814 receives as inputs bit PMD2 and PM02R[1]. Bit PMD2 is used to indicate whether PM state machine 351 is currently in or is transitioning to state D2. Bit PM02R[1] indicates whether PLL1 can be enabled in state D2. Hence, only when PM state machine 351 is currently in or is transitioning to state D2 and PLL1 can be enabled in state D2, AND-gate 814 outputs a HIGH signal.

The outputs of AND-gate 813–814 are provided as inputs to OR-gate 815 which receives as its third input bit PMD0. Bit PMD0 is used to indicate whether PM state machine 351 is currently in or is transitioning to state D0. Hence, when PM state machine 351 is currently in or is transitioning to state D0, or when PM state machine 351 is currently in or is transitioning to state D1 and PLL1 can be enabled in state D1, or when PM state machine 351 is currently in or is transitioning to state D2 and PLL1 can be enabled in state D2, OR-gate 815 outputs a HIGH signal to the input of D-type flip-flop 816 which is clocked by clock signal PMCLK. At each rising edge of clock signal PMCLK, flip-flop 816 latches its current input and provides it to its output. Accordingly, the output of flip-flop 816 is HIGH when the output of OR-gate 815 is HIGH. Signal PMRSTL is provided as a reset signal to flip-flop 816. The output of flip-flop 816 is provided as input to AND-gate 817 and the invert of the output of flip-flop 816 is provided as an input to AND-gate 818.

AND-gate 817 receives as its second input bit PMP1 which indicates the beginning of sub-state Sx1 (where x=0,1,2,3, and 4). The output of AND-gate 817 is provided as an input to D-type flip-flop 821 and to OR-gate 819. AND-gate 818 receives as its second input bit PMP7 which indicates the beginning of sub-state Sx7 (where x=0,1,2,3, and 4). The output of AND-gate 818 is provided as the second input to OR-gate 819. The output of OR-gate 819 is provided as an input to AND-gate 820 which receives as its second input clock signal PMCLK. The output of AND-gate 820 is used to clock flip-flop 821. AND-gate 820 allows flip-flop 821 to latch its input at the rising edge of clock signal PMCLK. The output of AND-gate 820 is enabled only when the output of AND-gate 817 is HIGH or when the output of AND-gate 818 is HIGH. Note that only one output can be HIGH at a time because PMP1 and PMP7 will not be active at the same time. When the output of AND-gate 817 is HIGH, the output of D-type flip-flop 821 will be set in the next rising edge of signal PMCLK. When the output of AND-gate 818 is HIGH, the output of AND-gate 817 will be LOW and the output of D-type flip-flop 821 will be reset in the next rising edge of signal PMCLK. The output of flip-flop 821 is provided as an input to AND-gate 822 which receives as its second input bit PM00R[1]. Bit PM00R[1] indicates whether PLL1 is to be enable. Signal PMRSTL is provided as a reset signal to flip-flop 821. In so doing, PLL1 enable signal PMPLL1EN is activated when bit PMP1 is active and deactivated when bit PMP7 is active depending on the output of flip-flop 806.

The sub-circuits used to generate PLL2 enable signal PMPLL2EN and PLL3 enable signal PMPLL3EN are identical to the sub-circuit used to generate PLL1 enable signal PMPLL1EN described above. However, to be expected, the sub-circuit used to generate PLL2 enable signal PMPLL2EN receives two different inputs bits PM01R[2] and PM02R[2] which indicate whether PLL2 can be enabled in state D1 and D2, respectively. Likewise, the sub-circuit used to generate PLL2 enable signal PMPLL3EN receives two different inputs bits PM01R[3] and PM02R[3] which indicate whether PLL3 can be enabled in state D1 and D2, respectively.

The sub-circuit used to generate oscillator enable signal PMOSCEN are very similar to the sub-circuits used to generate PLL1 enable signal PMPLL1EN, PLL2 enable signal PMPLL2EN, and PLL3 enable signal PMPLL3EN. However, the sub-circuit used to generate oscillator enable signal PMOSCEN includes two additional AND-gates. Accordingly, OR-gate 805 has five inputs rather than three like its counterparts (e.g., OR-gate 815, 825, and 835) in the other sub-circuits. The reason is that it must provide the capability to selectively enable the oscillator for all states S0x–S4x (where x is equal to 0,1,2,3,4,5,6,7). Unlike PLL1, PLL2, and PLL3 which are disabled in D3 and D4 states, in the current embodiment, the oscillator can be enabled in D3 and D4 states as controlled by PM00R[16] and PM00R[17]. Other than this difference, the sub-circuit used to generate oscillator enable signal PMOSCEN is very similar to the sub-circuits discussed earlier. For this reason, the sub-circuit used to generate oscillator enable signal PMOSCEN is not further discussed here.

Figure 9A:
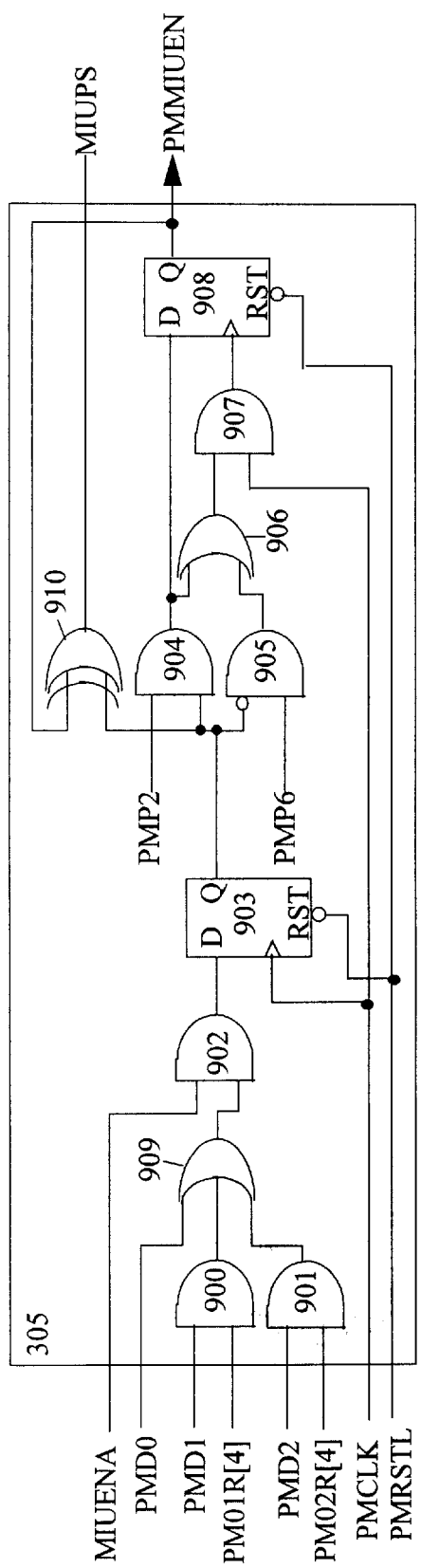
FIG. 9A is a block diagram illustrating in greater detail an embodiment of memory enable circuit 305 illustrated in FIG. 3.

FIG. 9A illustrates in greater detail an embodiment of memory enable circuit 305. As shown in FIG. 9A, memory enable circuit 305 comprises AND-gates 900–902, D-type flip-flop 903, AND-gates 904–905, OR-gate 906, AND-gate 907, D-type flip-flop 908, OR-gate 909, and XOR-gate 910. AND-gate 900 receives as inputs bits PMD1 and PM01R[4]. Bit PMD1 is used to indicate whether PM state machine 351 is currently in or is transitioning to state D1. Bit PM01R[4] indicates whether MIU 207 can be enabled in state D1. Hence, only when PM state machine 351 is currently in or is transitioning to state D1 and MIU 207 can be enabled in state D1, AND-gate 900 outputs a HIGH signal. AND-gate 901 receives as inputs bit PMD2 and PM02R[4]. Bit PMD2 is used to indicate whether PM state machine 351 is currently in or is transitioning to state D2. Bit PM02R[4] indicates whether MIU 207 can be enabled in state D2. Hence, only when PM state machine 351 is currently in or is transitioning to state D2 and MIU 207 can be enabled in state D2, AND-gate 901 outputs a HIGH signal.

The outputs of AND-gates 900–901 along with bit PMD0 are provided as inputs to OR-gate 909. Bit PMD0 is used to indicate whether PM state machine 351 is currently in or is transitioning to state D0. Hence, when PM state machine 351 is in or is transitioning to state D0, or when PM state machine 351 is currently in or is transitioning to state D1 and MIU 207 can be enabled in state D1, or when PM state machine 351 is currently in or is transistioning to state D2 and MIU 207 can be enabled in state D2, OR-gate 909 outputs a HIGH signal to the input of AND-gate 902. AND-gate 902 receives as a second input signal MIUENA which is a programmable register bit to enable/disable MIU 207. The output of AND-gate 902 is provided as an input of D-type flip-flop 903 which is clocked by clock signal PMCLK. At each rising edge of clock signal PMCLK, flip-flop 903 latches its current input and provides it to its output. Accordingly, if signal MIUENA is asserted, the output of flip-flop 903 is HIGH when the output of AND-gate 902 is HIGH. Signal PMRSTL is provided as a reset signal to flip-flop 903. The output of flip-flop 903 is provided as inputs to AND-gates 904 and to XOR-gate 910. The invert of flip-flop 903 is also provided as an input of AND-gate 905.

AND-gate 904 receives as its second input bit PMP2 which indicates the beginning of sub-state Sx2 (where x=0,1,2,3, and 4). The output of AND-gate 904 is provided as an input to D-type flip-flop 908 and OR-gate 906. AND-gate 905 receives as its second input bit PMP6 which indicates the beginning of sub-state Sx6 (where x=0,1,2,3, and 4). The output of AND-gate 905 is provided as the second input to OR-gate 906. The output of OR-gate 906 is provided as an input to AND-gate 907 which receives as its second input clock signal PMCLK. The output of AND-gate 907 is used to clock flip-flop 908. AND-gate 907 allows flip-flop 908 to latch its input at the rising edge of clock signal PMCLK. The output of flip-flop 908 is provided as MIU enable signal PMMIUEN. Signal PMRSTL is provided as a reset signal to flip-flop 908. In so doing, MIU enable signal PMMIUEN is activated when bit PMP2 is active and deactivated when bit PM6 is active depending on the output of flip-flop 903. Enable signal PMMIUEN is provided as a second input of XOR-gate 910 whose output is signal MIUPS. As such, signal MIUPS is asserted HIGH when MIU 207 is being enabled or when MIU 207 is being disabled to indicate that MIU power sequencing is needed.

Figure 9B:
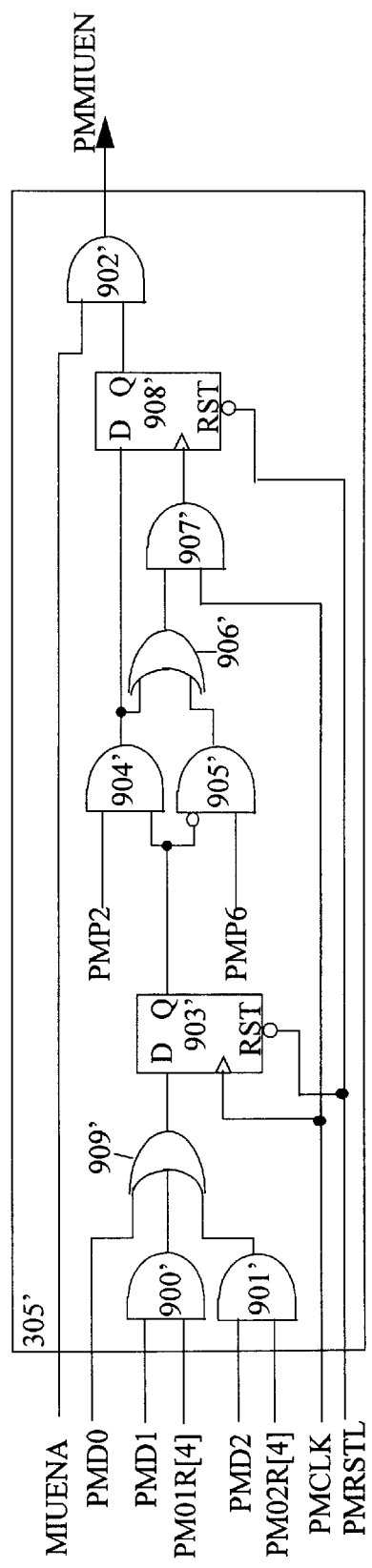
FIG. 9B is a block diagram illustrating in greater detail an alternate embodiment of memory enable circuit 305' illustrated in FIG. 3.

FIG. 9B illustrates in greater detail an alternate embodiment of memory enable circuit 305' which, unlike its counterpart memory enable circuit 305 of FIG. 9A, does not generate signal MIUPS because no power sequencing is required when MIU 207 is being enabled/disabled. In FIG. 9B, elements have primed reference numbers that correspond to their counterparts in FIG. 9A. As shown in FIG. 9A, memory enable circuit 305' comprises AND-gates 900'–902', D-type flip-flop 903', AND-gates 904'–905', OR-gate 906', AND-gate 907', D-type flip-flop 908', and OR-gates 909'. Unlike memory enable circuit 305, memory enable circuit 305' does not have a corresponding OR-gate 910 to generate signal MIUPS. In addition, instead of receiving as input the output of OR-gate 900', AND-gate 902' receives as input the output of flip-flop 908'. The remaining elements and their associated connections are identical to that in FIG. 9A. Given the detailed description of memory enable circuit 305 provided with respect to FIG. 9A, the operation and construction of alternate memory enable circuit 305' in FIG. 9B should be clear to a person of ordinary skill in the art. For this reason and for brevity, the detailed description of alternate memory enable circuit 305' is not provided.

Figure 10:
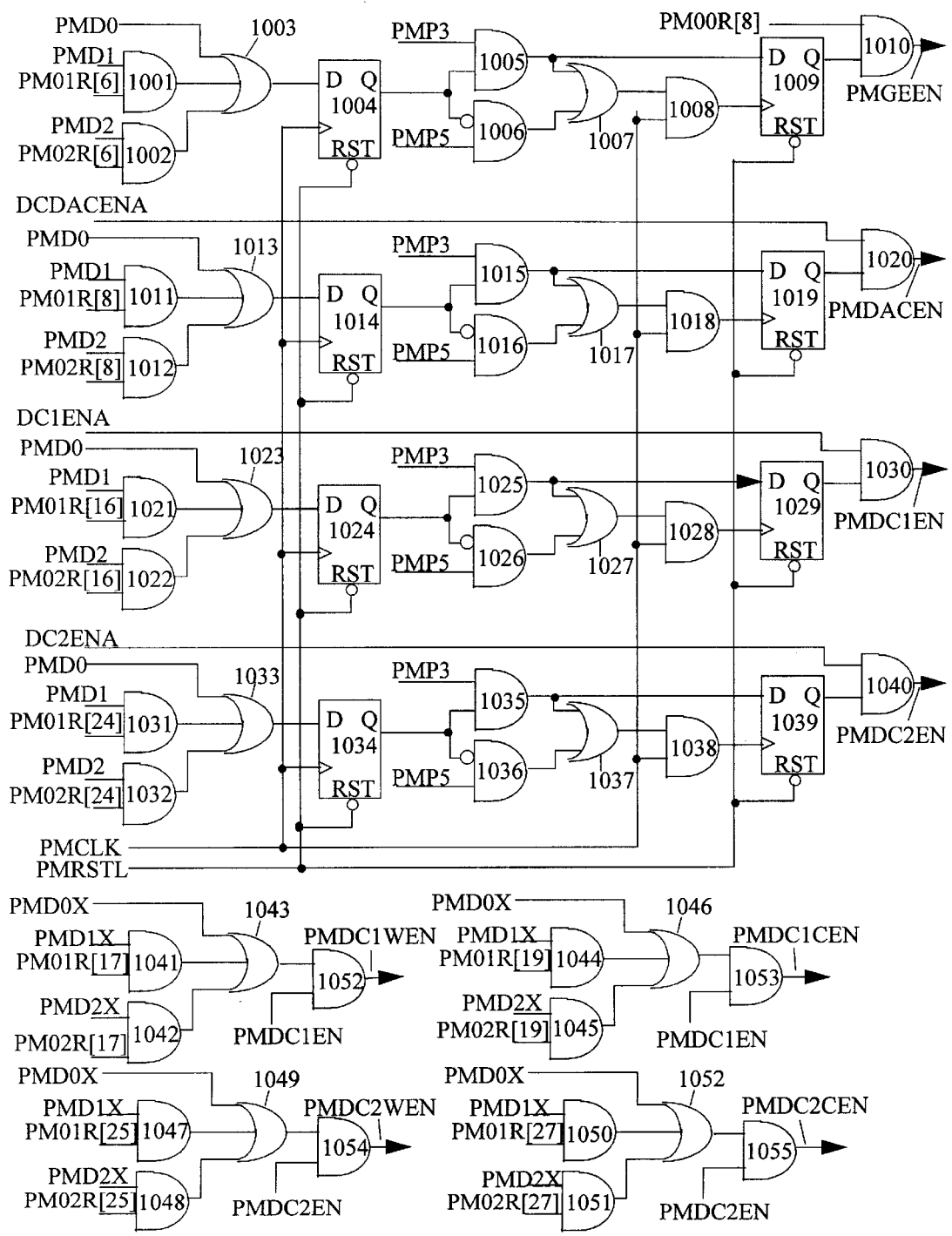
FIG. 10 is a block diagram illustrating in greater detail an embodiment of display enable circuit 306 illustrated in FIG. 3.

FIG. 10 illustrates in greater detail an embodiment of display enable circuit 306. Display enable circuit 306 consists of eight sub-circuits that are designed to generate graphics enable signals PMGEEN, DAC enable signal PMDACEN, graphics display controller 1 enable signal PMDC1EN , window enable signal for display controller 1 PMDC1WEN , cursor enable signal for display controller 1 PMDC1CEN , graphics display controller 2 enable signal PMDC2EN , window enable signal for display controller 2 PMDC2WEN , and cursor enable signal for display controller 2 PMDC2CEN . The four sub-circuits that are used to generate graphics enable signal PMGEEN, DAC enable signal PMDACEN, graphics display controller 1 enable signal PMDC1EN , and graphics display controller 2 enable signal PMDC2EN are identical to each other in terms of construction. As such, for brevity and clarity, only a detailed description of the sub-circuit used to generate graphics enable signal PMGEEN is provided here since this description is equally applicable to the sub-circuits used to generate DAC enable signal PMDACEN, graphics display controller 1 enable signal PMDC1EN , and graphics display controller 2 enable signal PMDC2EN except that their inputs are different.

The sub-circuit to generate graphics enable signal PMGEEN comprises AND-gates 1001–1002, OR-gate 1003, D-type flip-flop 1004, AND-gates 1005–1006, OR-gate 1007, AND-gate 1008, D-type flip-flop 1009, and AND-gate 1010. AND-gate 1001 receives as inputs bit PMD1 and PM01R[6]. Bit PMD1 is used to indicate whether PM state machine 351 is currently in or is transitioning to state D1. Bit PM01R[6] indicates whether GE 206 can be enabled in state D1. Hence, only when PM state machine 351 is currently in or is transitioning to state D1 and GE 206 can be enabled in state D1, AND-gate 1001 outputs a HIGH signal. AND-gate 1002 receives as inputs bit PMD2 and PM02R[6]. Bit PMD2 is used to indicate whether PM state machine 351 is currently in or is transitioning to state D2. Bit PM02R[6] indicates whether GE 206 can be enabled in state D2. Hence, only when state machine is currently in or is transitioning to state D2 and GE 206 can be enabled in state D2, AND-gate 1002 outputs a HIGH signal.

The outputs of AND-gate 1001–1002 are provided as inputs to OR-gate 1003 which receives as its third input bit PMD0. Bit PMD0 is used to indicate whether PM state machine 351 is currently in or is transitioning to state D0. Hence, when PM state machine 351 is currently in or is transitioning to state D0, or when PM state machine 351 is currently in or is transitioning to state D1 and GE 206 can be enabled in state D1, or when PM state machine 351 is currently in or is transitioning to state D2 and GE 206 can be enabled in state D2, OR-gate 1003 outputs a HIGH signal to D-type flip-flop 1004 which is clocked by clock signal PMCLK. At each rising edge of clock signal PMCLK, flip-flop 1004 latches its current input and provides it to its output. Accordingly, the output of flip-flop 1004 is HIGH when the output of OR-gate 1003 is HIGH. Signal PMRSTL is provided as a reset signal to flip-flop 1004. The output of flip-flop 1004 is provided as input to AND-gate 1005 and the invert of the output of flip-flop 1004 is provided as input to AND-gate 1006.

AND-gate 1005 receives as its second input bit PMP3 which indicates the beginning of sub-state Sx3. The output of AND-gate 1005 is provided as an input to D-type flip-flop 1009 and to OR-gate 1007. AND-gate 1006 receives as its second input bit PMP5 which indicates the beginning of sub-state Sx5. The output of AND-gate 1006 is provided as the second input to OR-gate 1007. The output of OR-gate 1007 is provided as an input to AND-gate 1008 which receives as its second input clock signal PMCLK. The output of AND-gate 1008 is used to clock flip-flop 1009. AND-gate 1008 allows flip-flop 1009 to latch its input at the rising edge of clock signal PMCLK. The output of flip-flop 1009 is provided as an input to AND-gate 1010 which receives as its second input bit PM00R[8]. Bit PM00R[8] indicates whether GE 206 is to be enable. Signal PMRSTL is provided as a reset signal to flip-flop 1009. In so doing, when PM00R[8] is HIGH, GE 206 enable signal PMGEEN is activated when bit PMP3 and the output of flip-flop 1004 are active and deactivated when bit PMP5 is active and the output of flip-flop 1004 is inactive.

The sub-circuits used to generate DAC enable signal PMDACEN, graphics display controller 1 enable signal PMDC1EN, and graphics display controller 2 enable signal PMDC2EN are identical to the sub-circuit used to generate GE enable signal PMGEEN described above. However, to be expected, the sub-circuit used to generate DAC enable signal PMDACEN receives different inputs namely bit DCDACENA which indicates whether DAC 210 is to be enabled, bit PM01R[8] which indicates whether the CRT display can be enabled in state D1, and PM02R[8] which indicates whether the CRT display can be enabled in state D2. Likewise, the sub-circuit used to generate graphics display controller 1 enable signal PMDC1EN receives different inputs namely bit DC1ENA which indicates whether the display controller 1 is to be enabled, PM01R[16] which indicates whether the display controller 1 can be enabled in state D1, and PM02R[16] which indicates whether the display controller 1 can be enabled in state D2. Likewise, the sub-circuit used to generate graphics display controller 2 enable signal PMDC2EN receives different inputs namely bit DC2ENA which indicates whether the display controller 2 is to be enabled, PM01R[24] which indicates whether the display controller 2 can be enabled in state D1, PM02R[24] which indicates whether the display controller 2 can be enabled in state D2. For brevity, these sub-circuits are not further discussed here.

Display controller 1 consists of a window controller 1 sub-circuit and cursor 1 sub-circuit. When enable signal PMDC1WEN is active, the window controller 1 sub-circuit can be enabled. Likewise, when enable signal PMDC1CEN is active, the cursor 1 sub-circuit can be enabled. Note that signals PMDC1WEN and PMDC1EN are both effective only when signal PMDC1EN is active and when the window controller 1 and cursor 1 sub-circuits, are enabled correspondingly.

The sub-circuits used to generate window enable signal for display controller 1 PMDC1WEN consists of AND-gates 1041–1042, OR-gate 1043, and AND-gate 1052. AND-gate 1041 receives as inputs bit PMD1X which indicates whether the power sequencing related to state Six (where x=0,1,2, 3,4,5,6, and 7) is occurring and bit PM01R[17] which indicates whether the window can be enabled in state D1. The output of AND-gate 1041 is provided as an input to OR-gate 1043. AND-gate 1042 receives as inputs bit PMD2x which indicates whether the power sequencing related to state S2x (where x=0,1,2,3,4,5,6, and 7) is occurring and bit PM02R[17] which indicates whether the window can be enabled in state D2. The output of AND-gate 1042 is provided as an input to OR-gate 1043. OR-gate 1043 receives as a third input bit PMD0X which indicates whether the power sequencing related to state S0x (where x=0,1,2, 3,4,5,6, and 7) is occurring. The output of OR-gate 1043 along with graphics display controller 1 enable signal PMDC1EN are provided as input to AND-gate 1052. The output of AND-gate 1052 is window enable signal for display controller 1 PMDC1WEN.

The sub-circuits used to generate cursor enable signal for display controller 1 PMDC1CEN, window enable signal for display controller 2 PMDC2WEN, and cursor enable signal for display controller 2 PMDC2CEN are identical to the sub-circuit used to generate window enable signal for display controller 1 PMDC1WEN described above. However, to be expected, the sub-circuit used to generate window enable signal for display controller 2 PMDC2WEN receives different inputs namely bit PM01R[25] which indicates whether the window can be enabled in state D1 and PM02R[25] which indicates whether the window can be enabled in state D2 as well as graphics display controller 2 enable signal PMDC2EN. Likewise, the sub-circuit used to generate cursor enable signal for display controller 1 PMDC1EN receives different inputs namely bit PM01R[19] which indicates whether the cursor can be enabled in state D1 and PM02R[19] which indicates whether the cursor can be enabled in state D2. Likewise, the sub-circuit used to generate cursor enable signal for display controller 2 PMDC2CEN receives different inputs namely bit PM01R[27] which indicates whether the cursor can be enabled in state D1 and PM02R[27] which indicates whether the cursor can be enabled in state D2. For brevity, these sub-circuits are not further discussed here.

Figure 11:
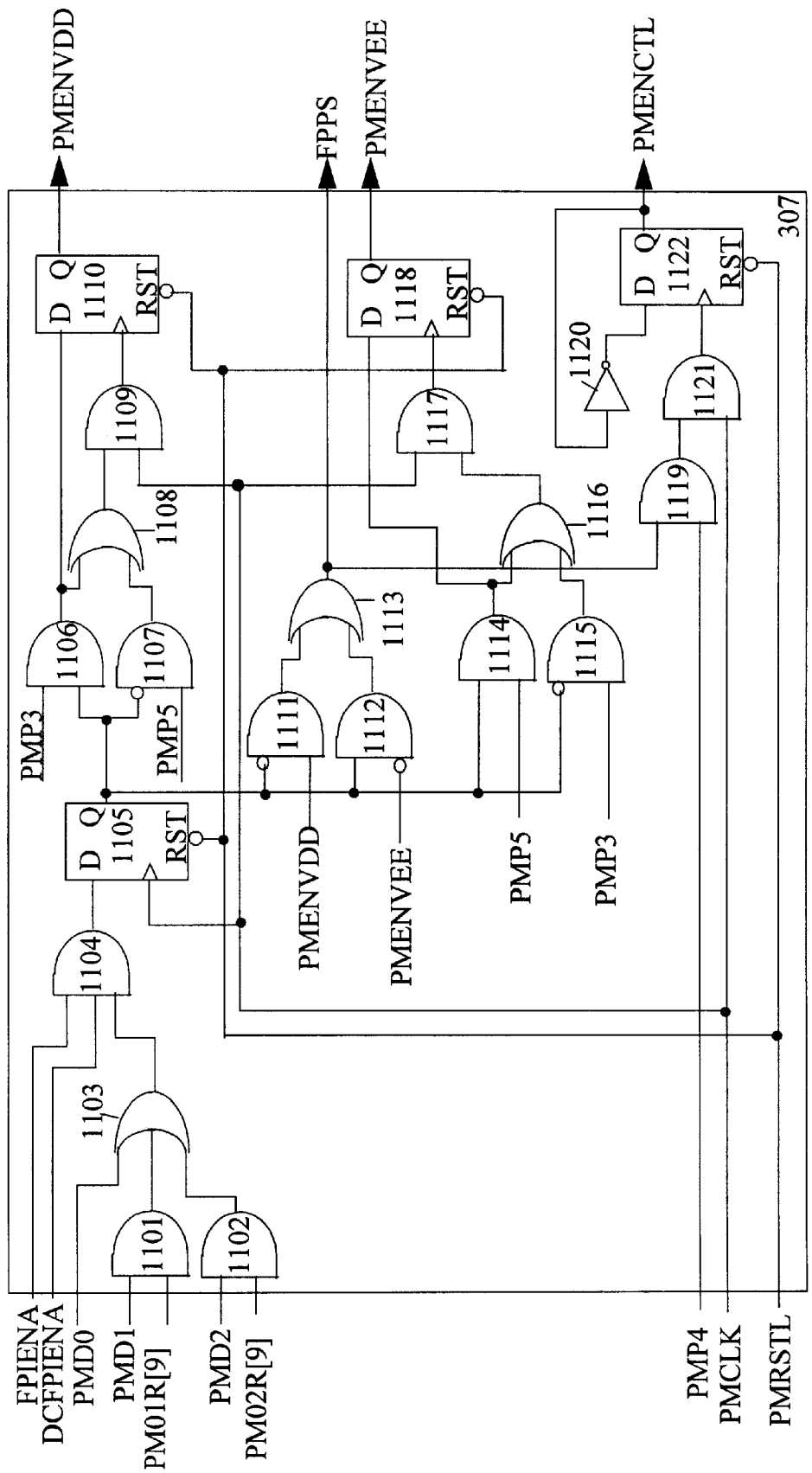
FIG. 11 is a block diagram illustrating in greater detail an embodiment of flat panel enable circuit 307 illustrated in FIG. 3.

FIG. 11 illustrates in greater detail an embodiment of flat panel enable circuit 307. As shown in FIG. 11, flat panel enable circuit 307 generates power supply 1 enable signal PMENVDD, power supply 2 enable signal PMENVEE, flat panel interface enable signal PMENCTL, and signal FPPS. Signal PMENCTL indicates whether FPI 209 is to be enabled, signal FPPS indicates whether flat panel power sequencing is needed (i.e., when the flat panel display is being enabled or disabled), power supply 1 enable signal PMENVDD indicates whether power supply 1 is to be enabled, and power supply 2 enable signal PMENVEE indicates whether power supply 2 is to be enabled. Flat panel enable circuit 307 comprises AND-gates 1101–1102, OR-gate 1103, AND-gate 1104, D-type flip-flop 1105, AND-gates 1106–1107, OR-gate 1108, AND-gate 1109, D-type flip-flop 1110, AND-gates 1111–1112, OR-gate 1113, AND-gates 1114–1115, OR-gate 1116, AND-gate 1117, D-type flip-flop 1118, AND-gate 1119, inverter 1120, AND-gate 1121, and D-type flip-flop 1122.

AND-gate 1101 receives as inputs bit PMD1 which indicates whether PM state machine 351 is currently in or is transitioning to state D1 and bit PM01R[9] which indicates whether FPI 209 can be enabled in state D1. Hence, only when PM state machine 351 is currently in or is transitioning to state D1 and FPI 209 can be enabled in state D1, AND-gate 1101 outputs a HIGH signal. AND-gate 1102 receives as inputs bit PMD2 and PM02R[9]. Bit PMD2 is used to indicate whether PM state machine 351 is currently in or is transitioning to state D2. Bit PM02R[9] indicates whether FPI 209 can be enabled in state D2. The outputs of AND-gates 1101–1102 are provided as inputs OR-gate 1103. The third input to OR-gate 1103 is bit PMD0 which indicates whether PM state machine 351 is currently in or is transitioning to state D0. OR-gate 1103 provides its output a s a n input to AND-gate 1104. Signal FPIENA indicates that FPI 209 is to be enabled/disabled and signal DCFPIENA indicates that display controller 1&2 208, which is providing data to FPI 209, is also enabled.

Hence, when PM state machine 351 is currently in or is transitioning to state D0, or when PM state machine 351 is currently in or transitioning to state D1 and FPI 209 can be enabled in state D1, or when PM state machine 351 is currently in or is transitioning to state D2 and FPI 209 can be enabled in state D2, AND-gate 1104 outputs a HIGH signal to D-type flip-flop 1105 which is clocked by clock signal PMCLK. At each rising edge of clock signal PMCLK, flip-flop 1105 latches its current input and provides it to its output. Accordingly, when both signals FPIENA and DCFPIENA are HIGH, the output of flip-flop 1105 is HIGH when the output of AND-gate 1104 is HIGH. Signal PMRSTL is provided as a reset signal to flip-flop 1105. The output of flip-flop 1105 is provided as input to AND-gate 1106 and the invert of flip-flop 1105 is provided as input to AND-gate 1107.

AND-gate 1106 receives as its second input bit PMP3 which indicates the beginning of sub-state Sx3 (where x=0,1,2,3, and 4). The output of AND-gate 1106 is provided as an input to D-type flip-flop 1110 and to OR-gate 1108. AND-gate 1107 receives as its second input bit PMP5 which indicates whether sub-state Sx5 (where x=0,1,2,3, and 4) is complete. The output of AND-gate 1107 is provided as the second input to OR-gate 1108. The output of OR-gate 1108 is provided as an input to AND-gate 1109 which receives as its second input clock signal PMCLK. The output of AND-gate 1109 is used to clock flip-flop 1110. AND-gate 1109 allows flip-flop 1110 to latch its input at the rising edge of clock signal PMCLK. The output of flip-flop 1110 is power supply 1 enable signal PMENVDD. Signal PMRSTL is provided as a reset signal to flip-flop 1110. In so doing, power supply 1 enable signal PMENVDD is activated when bit PMP3 and the output of flip-flop 1105 are active and deactivated when bit PMP5 is active and the output of flip-flop 1105 is inactive.

The output of flip-flop 1105 is also provided as input to AND-gate 1114 and the invert of flip-flop 1105 is provided as input to AND-gate 1115. AND-gate 1114 receives as its second input bit PMP5 which indicates the beginning of sub-state Sx5 where x=0-to-4. The output of AND-gate 1114 is provided as an input to D-type flip-flop 1118 and to OR-gate 1116. AND-gate 1115 receives as its second input bit PMP3 which indicates the beginning of sub-state Sx3 where x=0-to-4. The output of AND-gate 1115 is provided as the second input to OR-gate 1116. The output of OR-gate 1116 is provided as an input to AND-gate 1117 which receives as its second input clock signal PMCLK. The output of AND-gate 1117 is used to clock flip-flop 1118. AND-gate 1117 allows flip-flop 1118 to latch its input at the rising edge of clock signal PMCLK. The output of flip-flop 1118 is power supply 2 enable signal PMENVEE. Signal PMRSTL is provided as a reset signal to flip-flop 1118. In so doing, power supply 2 enable signal PMENVEE is activated when bit PMP5 and the output of flip-flop 1105 are active and deactivated when bit PMP3 is active and the output of flip-flop 1105 is inactive.

Power supply 1 enable signal PMENVDD is provided as an input to AND-gate 1111 which receives as a second input the invert of the output of flip-flop 1105. The output of AND-gate 1111 is provided as an input to OR-gate 1113. The invert of power supply 2 enable signal PMENVEE is provided as an input to AND-gate 1112 which receives as a second input the output of flip-flop 1105. The output of AND-gate 1112 is provided as a second input to OR-gate 1113. The output of OR-gate 1113 is enable signal FPPS. Accordingly, signal FPPS is activated when the flat panel display is being enabled or being disabled.

Enable signal FPPS is provided as an input to AND-gate 1119 which receives as its second input bit PMP4 which indicates the beginning of sub-state Sx4 (where x=0,1,2,3, and 4). The output of AND-gate 1119 is provided as an input to AND-gate 1121. AND-gate 1121 receives as its second input bit clock signal PMCLK. The output of AND-gate 1121 is used to clock flip-flop 1122. AND-gate 1121 allows flip-flop 1122 to latch its input at the rising edge of clock signal PMCLK. The output of flip-flop 1122 is flat panel interface enable signal PMENCTL. The invert of flat panel interface enable signal PMENCTL is provided to the input of flip-flop 1122. Signal PMRSTL is provided as a reset signal to flip-flop 1118. In so doing, flat panel interface enable signal PMENCTL is inverted after enable signal FPPS is asserted and when bit PMP4 is active.

Referring now to FIGS. 11A–11G illustrating, as examples, the timing diagrams of the power-up sequence associated with flat panel enable circuit 307. More specifically, FIG. 11A–11C illustrate the timing diagrams for signals PMP3–PMP5, respectively. FIGS. 11D–11G illustrate the timing diagrams for signals PMENVDD, PMENCTL, PMENVEE, and FPPS, respectively. As shown, when signal FPPS is asserted and bit PMP3 is active, enable signal PMENVDD is activated. When signal FPPS is asserted and bit PMP4 is active, flat panel interface enable signal PMENCTL is activated. When signal FPPS is asserted and bit PMP5 is active, enable signal PMENVEE is activated.

Conversely, FIGS. 11H–11N illustrate, as examples, the timing diagram of the power-down sequence associated with flat panel enable circuit 307. More specifically, FIGS. 11H–11J illustrate the timing diagrams for signals PMP3–PMP5, respectively. FIGS. 11K–11N illustrate the timing diagrams for signals PMENVDD, PMENCTL, PMENVEE, and FPPS, respectively. As shown, when signal FPPS is asserted and bit PMP3 is active, enable signal PMENVEE is deactivated. When signal FPPS is asserted and bit PMP4 is active, flat panel interface enable signal PMENCTL is deactivated. When signal FPPS is asserted and bit PMP5 is active, enable signal PMENVDD is deactivated. The power-down sequence and the power-up sequence occur in the reverse order relative to each other. For example, enable signal PMENVDD, which is activated first in the power-up sequence, is deactivated last in the power-down sequence; enable signal PMENVEE, which is activated last in the power-up sequence, is deactivated first in the power-down sequence.

An embodiment of the present invention, a system, apparatus, and method that allows a PMU that allows for power up sequencing as well as power down sequencing to occur in one sequence, for selectively powering up and powering down circuits in a power sequence, and for selecting the power sequencing interval is presented. While the present invention has been described in particular embodiments, the present invention should not be construed as limited by such embodiments, but rather construed according to the below claims.

What is claimed is:

1. A programmable Power Management Unit (PMU) comprising:
   a state machine receiving as inputs state control signals, in response to the state control signals, the state machine selecting one of a number of main power states for the PMU wherein the selected main power state has N sub-states, in response to control signals, the state machine sequencing through the N sub-states of the selected main power state for the PMU, the state machine generating signals indicating the selected main power state and the N sub-states that the state machine is currently in, wherein each sub-state controlling a corresponding module such that the N sub-states are combined to control the corresponding modules according to a desired sequence, wherein the state machine sequencing the N sub-states according to the sequence that is determined by programmable registers; and a plurality of enable circuits coupled to the corresponding modules, the plurality of enable circuits receiving as inputs the signals from the state machine, the plurality of enable circuits generating signals to control the corresponding modules.

2. The PMU of claim 1, wherein the N sub-states control whether the corresponding modules are disabled and whether the corresponding modules are not disabled.

3. The PMU of claim 2, wherein whether the corresponding modules are to be disabled and whether the corresponding modules are not to be disabled are predetermined.

4. The PMU of claim 2, wherein whether the corresponding modules are to be disabled and whether the corresponding modules are not to be disabled are programmable.

5. The PMU of claim 1, wherein the control signals indicating that a transition from one main power state to another main power state.

6. The PMU of claim 1, wherein the control signals indicating that a predetermined event has occured.

7. The PMU of claim 6, wherein the predetermined event is when a particular module is being enabled.

8. The PMU of claim 1, wherein the state machine sequencing the N sub-states according to a predetermined sequence.

9. The PMU of claim 1, wherein the state machine sequencing the N sub-states according to a sequence that is determined by which module being enabled and disabled.

10. The PMU of claim 1, wherein the state machine sequencing the N sub-states according to a sequence that is determined by which event triggering the sequencing of the N sub-states.

11. The PMU of claim 1 further comprising a counter circuit coupled to the state machine, the counter circuit receiving as inputs interval control signals, the counter circuit monitoring power sequencing intervals in response to the interval control signals, the counter circuit generating signals indicating whether the power sequencing intervals have expired.

12. The PMU of claim 11, wherein the power sequencing intervals are fixed.

13. The PMU of claim 11 further comprising a programmable register coupled to the counter circuit and the plurality of enable circuits, the programmable register storing interval control information on duration of power sequencing intervals.

14. The PMU of claim 11, further comprising a decoder circuit receiving as inputs the signals from the state machine, in response to the signals from the state machine, the decoder circuit monitoring status of the main power state and the N sub-states that the state machine is currently engaged in and generating status signals to indicate the status of the main power state and sub-state.

15. The PMU of claim 1, wherein the state machine supporting five (5) main power states: a normal power state D0, a first programmable power state D1, a second programmable power state D2, a software-controlled power state D3, and a hardware-controlled power state D4.

16. The PMU of claim 15, wherein during the normal power state D0, no circuit and module is disabled.

17. The PMU of claim 16, wherein the first programmable power state D1 represents a first power saving mode during which selected circuits and modules are disabled and other circuits and modules are not disabled as controlled by a first register of the plurality of programmable registers.

18. The PMU of claim 17, wherein the second programmable power state D2 represents a second power saving mode during which selected circuits and modules are disabled and other circuits and modules are not disabled as controlled by a second register of the plurality of programmable registers.

19. The PMU of claim 18, wherein the software controlled power state D3 represents a first sleep mode during which most predetermined circuits and modules are disabled.

20. The PMU of claim 19, wherein the hardware controlled power state D4 represents a second sleep mode during which most predetermined circuits and modules are disabled.

21. The PMU of claim 20, wherein the plurality of enable circuits comprising a clock enable circuit, a memory enable circuit, a display/graphics engine enable circuit, and a flat panel enable circuit.

22. A computer system comprising:
a central processing unit (CPU);
system memory coupled to the CPU;
a graphics/display controller coupled to the CPU and the system memory, the graphics controller comprising:
  a CPU interface unit (CIF) coupled to the CPU;
  a graphics engine (GE) coupled to the CIF;
  a memory interface unit (MIU) coupled to the GE
  a frame buffer coupled to the MIU;
  a display controller coupled to the MIU;
  a flat panel interface coupled to the display controller;
  a CRT Digital-to-Analog converter (DAC) coupled to the display controller;
  a plurality of phase lock loop circuits; and
  a programmable Power Management Unit (PMU) comprising:
    a state machine receiving as inputs state control signals, in response to the state control signals, the state machine selecting one of a number of main power states for the PMU wherein the selected main power state has N sub-states, in response to control signals, the state machine sequencing through the N sub-states of the selected main power state for the PMU, the state machine generating signals indicating the selected main power state and the N sub-states that the state machine is currently in, wherein each sub-state controlling a corresponding module such that the N sub-states are combined to control the corresponding modules according to a desired sequence, wherein the state machine sequencing the N sub-states according to the sequence that is determined by programmable registers; and
    a plurality of enable circuits coupled to the corresponding modules, the plurality of enable circuits receiving as inputs the signals from the state machine, the plurality of enable circuits generating signals to control the corresponding modules.

23. The computer system of claim 22, wherein the N sub-states control whether the corresponding modules are disabled a nd whether the corresponding modules are not disabled.

24. The computer system of claim 23, wherein whether the corresponding modules are to be disabled and whether the corresponding modules are not to be disabled are predetermined.

25. The computer system of claim 23, wherein whether the corresponding modules are to be disabled and whether the corresponding modules are not to be disabled are programmable.

26. The computer system of claim 22, wherein the control signals indicating that a transition from one main power state to another main power state.

27. The computer system of claim 22, wherein the control signals indicating that a predetermined event has occured.

28. The computer system of claim 27, wherein the predetermined event is when a particular module is being enabled.

29. The computer system of claim 22, wherein the state machine sequencing the N sub-states according to a predetermined sequence.

30. The computer system of claim 22, wherein the state machine sequencing the N sub-states according to a sequence that that is determined by which module being enabled and disabled.

31. The computer system of claim 22, wherein the state machine sequencing the N sub-states according to a sequence that is determined by which event triggering the sequencing of the N sub-states.

32. The computer system of claim 22 further comprising a counter circuit coupled to the state machine, the counter circuit receiving as inputs interval control signals, the counter circuit monitoring power sequencing intervals in response to the interval control signals, the counter circuit generating signals indicating whether the power sequencing intervals have expired.

33. The computer system of claim 32, wherein the power sequencing intervals are fixed.

34. The computer system of claim 32 further comprising a programmable register coupled to the counter circuit and the plurality of enable circuits, the programmable register storing interval control information on duration of power sequencing intervals.

35. The computer system of claim 32, further comprising a decoder circuit receiving as inputs the signals from the state machine, in response to the signals from the state machine, the decoder circuit monitoring status of the main power state and the N sub-states that the state machine is currently engaged in and generating status signals to indicate the status of the main power state and sub-state.

36. The computer system of claim 22, wherein the state machine supporting five (5) main power states: a normal power state D0, a first programmable power state D1, a second programmable power state D2, a software-controlled power state D3, and a hardware-controlled power state D4.

37. A method to manage power in a circuit comprising:
in response to state control signals, selecting one of a number of main power states, wherein the selected main power state has N sub-states, each sub-state controlling a corresponding module such that the N sub-states are combined to control the corresponding modules according to a desired sequence;
in response to control signals, sequencing through the N sub-states of the selected main power state, wherein the N sub-states are sequenced according to a sequence that is determined by programmable registers;
monitoring current status of the main power state and sub-state;
generating signals indicating the current status of the selected main power state and sub-state; and
in response to the signals indicating the status of the selected main power state and the sub-state, generating signals to enable selected sub-circuits in the circuit.

38. The method of claim 37 further comprising the steps:
in response to interval control signals, monitoring power sequencing intervals; and
generating signals indicating whether the power sequencing intervals have expired.

* * * * *